(12) United States Patent
Kushida et al.

(10) Patent No.: US 8,823,344 B2
(45) Date of Patent: Sep. 2, 2014

(54) CONTROL CIRCUIT, ELECTRONIC DEVICE, AND METHOD FOR CONTROLLING POWER SUPPLY

(75) Inventors: Koichiro Kushida, Kasugai (JP);
Kazuyoshi Futamura, Yokohama (JP);
Masao Kumagai, Kasugai (JP)

(73) Assignee: Spansion LLC, Sunnyvale, CA (US)

( * ) Notice: Subject to any disclaimer, the term of this patent is extended or adjusted under 35 U.S.C. 154(b) by 308 days.

(21) Appl. No.: 13/328,775

(22) Filed: Dec. 16, 2011

(65) Prior Publication Data

US 2012/0212195 A1 Aug. 23, 2012

(30) Foreign Application Priority Data

Feb. 23, 2011 (JP) ................... 2011-037678

(51) Int. Cl.
*G05F 1/46* (2006.01)
*H02M 3/158* (2006.01)
*H02M 3/156* (2006.01)

(52) U.S. Cl.
CPC .......... *H02M 3/1588* (2013.01); *Y02B 70/1466* (2013.01); *H02M 2003/1566* (2013.01)
USPC ....................................................... 323/271

(58) Field of Classification Search
USPC ........................ 323/222, 271, 282–283, 313
See application file for complete search history.

(56) References Cited

U.S. PATENT DOCUMENTS

| 7,456,623 | B2 | 11/2008 | Hasegawa et al. |
| 7,609,042 | B2 * | 10/2009 | Kokubun et al. ............... 323/284 |
| 7,843,179 | B2 | 11/2010 | Hasegawa et al. |
| 7,876,076 | B2 | 1/2011 | Hasegawa |
| 2010/0046250 | A1 | 2/2010 | Noda |

FOREIGN PATENT DOCUMENTS

| JP | 2007-202376 A | 8/2007 |
| JP | 2007-306719 A | 11/2007 |
| JP | 2008-125226 | 5/2008 |

OTHER PUBLICATIONS

First Office Action (with English-Language Translation) directed to related Chinese Patent Application No. 201110461257.3, mailed Dec. 3, 2013; 20 pages.

* cited by examiner

*Primary Examiner* — Adolf Berhane
*Assistant Examiner* — Yemane Mehari
(74) *Attorney, Agent, or Firm* — Sterne, Kessler, Goldstein & Fox P.L.L.C.

(57) ABSTRACT

A control circuit arranged in a power supply including first and second switches to control an output voltage of the power supply. The control circuit includes a first control circuit that switches the first and second switches in a complementary manner in accordance with a comparison result of a first reference voltage and a feedback voltage corresponding to the output voltage of the power supply. A first comparison circuit compares the output voltage or feedback voltage with a second reference value. A second comparison circuit compares a coupling point current flowing through a coupling point between the first and second switches with a third reference value. A second control circuit disables complementary switching of the first and second switches in accordance with an output signal from the first comparison circuit and enables the complementary switching in accordance with an output signal of the second comparison circuit.

15 Claims, 17 Drawing Sheets

CONTROL CIRCUIT, ELECTRONIC DEVICE, AND METHOD FOR CONTROLLING POWER SUPPLY

CROSS-REFERENCE TO RELATED APPLICATIONS

This application is based upon and claims the benefit of priority from prior Japanese Patent Application No. 2011-37678, filed on Feb. 23, 2011, the entire contents of which are incorporated herein by reference.

FIELD

The present embodiments relate to a control circuit, an electronic device, and a method for controlling a power supply.

BACKGROUND

Step-down switching DC-DC converters are used to supply power-supply voltages to various electronic devices. Such a DC-DC converter often includes a rectifier that reduces rectification loss by performing synchronous rectification. A switch element, such as a metal oxide semiconductor (MOS) transistor, may be used as the rectifier.

FIG. 22 illustrates a conventional step-down DC-DC converter 4 that performs synchronous rectification. The step-down DC-DC converter 4 includes a main transistor T11, a synchronous transistor T12, a coil L11, a smoothing capacitor C11, and a control circuit 5 for controlling activation and inactivation of the transistors T11 and T12 in a substantially complementary manner.

The step-down DC-DC converter 4 alternately activates and inactivates the main transistor T11 and the synchronous transistor T12 to maintain an output voltage Voa at a target voltage. For example, the main transistor T11 is activated in response to a high (H) level control signal DHa to supply energy from an input terminal to an output terminal. Further, the main transistor T11 is inactivated to release energy accumulated in the coil L11. The synchronous transistor T12 is activated in response to an H level control signal DLa generated in synchronization with the timing at which the energy accumulated in the coil L11 is released to a load. The duty ratio of a pulse signal for driving the main transistor T11 is determined by the ratio of an input voltage Vi and the output voltage Voa. However, the DC-DC converter 4 executes feedback control in accordance with the output voltage Voa or feedback control in accordance with the output voltage Voa and an output current Io in a current control mode. This maintains the output voltage Voa at the target voltage. Examples of such feedback control include pulse width modulation (PWM) control and pulse frequency modulation (PFM) control.

When the load state of this synchronous rectification step-down DC-DC converter 4 suddenly changes from a heavy load to a light load or no load, the step-down DC-DC converter 4 would supply the load with power exceeding the required amount. In this case, the output voltage Voa increases and overshoots the target voltage.

Japanese Laid-Open Patent Publication No. 2008-125226 describes a technique for inactivating the main transistor T11 and activating the synchronous transistor T12 when the output voltage Voa increases to a certain voltage. This decreases the amount of current flowing through the output terminal Po and prevents the output voltage Voa from increasing. With the technique described in the publication, the synchronous transistor T12 is inactivated when the overshooting output voltage Voa decreases to the target voltage.

With the technique described in the publication, an amount ΔVoa of overshoot of the output voltage Voa produced when the load state suddenly changes may be expressed by the following equation, in which Voa is the voltage value of the output voltage Voa, ΔIo is the amount of change of the output current Io, L11 is the inductance value of the choke coil L11, and C11 is the capacitance value of the capacitor C11.

$$\Delta Voa = \frac{\Delta Io \times t}{2 \times C11} \quad (1)$$

whereas $$t = \frac{L11 \times \Delta Io}{Voa}$$

With the technique described in the above publication, the synchronous transistor T12 is activated after the overshooting occurs. As a result, the amount of current flowing through the output terminal Po decreases gradually. This decreases the overshooting amount ΔVoa of the output voltage Voa. However, a gradient along which the coil current IL changes is determined by V0/L during the activated period of the transistor T12. As a result, the overshooting amount ΔVoa is decreased by a relatively small degree.

SUMMARY

A first aspect of the embodiments is a control circuit arranged in a power supply including a first switch and a second switch. The control circuit controls an output voltage of the power supply. The control circuit includes a first control circuit coupled to the first switch and the second switch of the power supply. The first control circuit switches the first switch and the second switch in a complementary manner in accordance with a comparison result of a first reference voltage and a voltage value of a feedback voltage corresponding to the output voltage of the power supply. A first comparison circuit compares one of a voltage value of the output voltage and the voltage value of the feedback voltage with a second reference value. A second comparison circuit compares a current value of a coupling point current flowing through a coupling point between the first switch and the second switch with a third reference value. A second control circuit disables complementary switching of the first switch and the second switch and inactivates the second switch in accordance with an output signal from the first comparison circuit. The second control circuit enables the disabled complementary switching in accordance with an output signal of the second comparison circuit.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

DESCRIPTION OF EMBODIMENTS

First Embodiment

A first embodiment will be described with reference to FIGS. 1 to 5.

Figure 1:
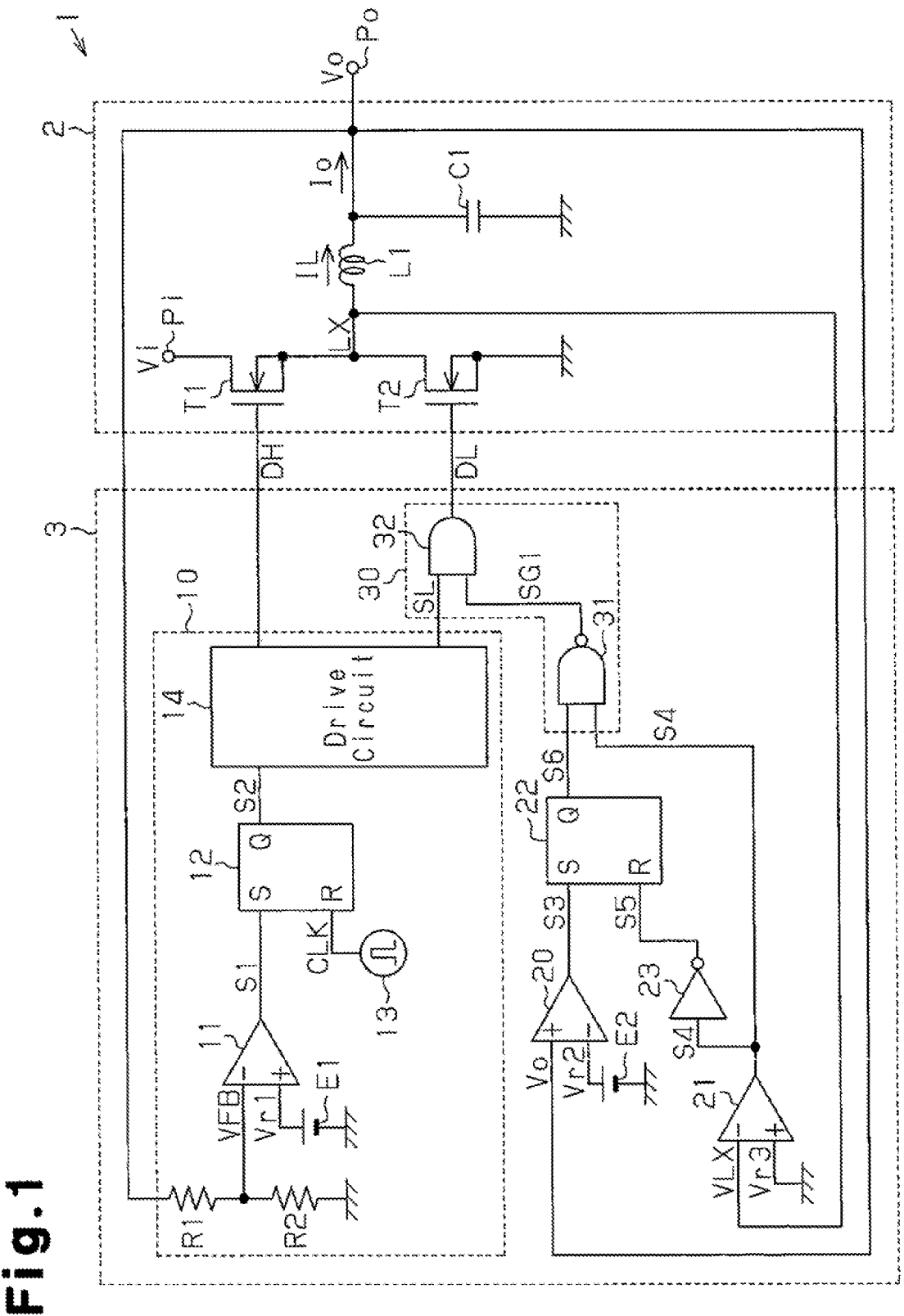
FIG. 1 is a block circuit diagram of a DC-DC converter according to a first embodiment.

As illustrated in FIG. 1, a step-down DC-DC converter 1 includes a conversion unit 2 and a control circuit 3. The conversion unit 2 receives an input voltage Vi and generates an output voltage Vo, which is lower than the input voltage Vi. The control circuit 3 controls the conversion unit 2.

The internal configuration of the conversion unit 2 will be described.

A main transistor T1 and a synchronous transistor T2 are coupled in series between an input terminal Pi, to which the input voltage Vi is provided, and a low-potential power supply line (ground in this example) having a lower potential than the input voltage Vi. The main transistor T1 and the synchronous transistor T2 are N-channel metal oxide semiconductor (MOS) transistors.

The transistor T1 has a first terminal (drain), which is coupled to the input terminal Pi, and a second terminal (source), which is coupled to a first terminal (drain) of the transistor T2. A second terminal (source) of the transistor T2 is grounded.

A control terminal (gate) of the transistor T1 is provided with a control signal DH from the control circuit 3, whereas a control terminal (gate) of the transistor T2 is provided with a control signal DL from the control circuit 3. The transistors T1 and T2 are activated and inactivated in a substantially complementary manner in response to the control signals DH and DL. The transistor T1 is an example of a first switch. The transistor T2 is an example of a second switch.

A node LX between the transistors T1 and T2 is coupled to a first terminal of a coil L1. A second terminal of the coil L1 is coupled to an output terminal Po, from which the output voltage Vo is output. In this manner, the main transistor T1 and the coil L1 are coupled in series between the input terminal Pi and the output terminal Po. The second terminal of the coil L1 is also coupled to a first terminal of a smoothing capacitor (a capacitor) C1. A second terminal of the capacitor C1 is grounded. The smoothing capacitor C1 is an element of a smoothing circuit that is used to smooth the output voltage Vo.

When the main transistor T1 is activated and the synchronous transistor T2 is inactivated in the conversion unit 2, a coil current IL determined in accordance with a potential difference between the input voltage Vi and the output voltage Vo flows through the coil L1. As a result, energy accumulates in the coil L1. When the main transistor T1 is inactivated and the synchronous transistor T2 is activated, the coil L1 releases its accumulating energy. This causes an induction current (the coil current IL) to flow through the coil L1. Through this operation, the conversion unit 2 generates the output voltage Vo that is lower than the input voltage Vi. The output voltage Vo is then supplied to a load (not illustrated) coupled to the output terminal Po. An output current Io is also supplied to the load.

The control circuit 3 adjusts the pulse width of the control signals DH and DL based on the output voltage Vo fed back from the conversion unit 2. The control circuit 3 includes a first control circuit 10, a first comparison circuit 20, and a second comparison circuit 21. The first control circuit 10 controls activation and inactivation of the transistors T1 and T2 in a complementary manner in accordance with a comparison between the output voltage Vo and a first reference voltage Vr1. The first comparison circuit 20 compares the output voltage Vo and a second reference voltage Vr2. The second comparison circuit 21 compares a voltage VLX at the node LX and a third reference voltage Vr3. The control circuit 3 further includes a second control circuit 30. The second control circuit 30 disables the complementary switching of the transistors T1 and T2 in accordance with the comparison result obtained by the first comparison circuit 20. The second control circuit 30 enables the complementary switching of the transistors T1 and T2 in accordance with the comparison result obtained by the second comparison circuit 21. The configurations of these circuits will be described.

The first control circuit 10 includes a comparator 11. An inversion input terminal of the comparator 11 is supplied with a feedback voltage VFB generated from the output voltage Vo. For example, in the first embodiment, the inversion input terminal of the comparator 11 is provided with the feedback voltage VFB generated by resistors R1 and R2. The resistor R1 has a first terminal coupled to the output terminal Po, through which the output voltage Vo is fed back. The resistor R1 has a second terminal coupled to a first terminal of the resistor R2. A second terminal of the resistor R2 is grounded. A coupling point between the resistors R1 and R2 is coupled to the inversion input terminal of the comparator 11. The resistors R1 and R2 generate the feedback voltage VFB by dividing the output voltage Vo in accordance with their resistance values. The value of the feedback voltage VFB corresponds to the ratio of the resistance values of the resistors R1 and R2 and the potential difference between the output voltage Vo and the ground. The feedback voltage VFB generated by the resistors R1 and R2 is proportional to the output voltage Vo.

A non-inversion input terminal of the comparator 11 is provided with the first reference voltage Vr1, which is generated by a first reference power supply E1. The first reference voltage Vr1 is set in accordance with the target voltage (the target value) of the output terminal Vo. The comparator 11 generates an output signal S1 corresponding to a comparison between the feedback voltage VFB and the first reference voltage Vr1. For example, the comparator 11 generates a low (L) level output signal S1 when the feedback voltage VFB is higher than the first reference voltage Vr1, and generates a high (H) level output signal S1 when the feedback voltage VFB is lower than the first reference voltage Vr1. The comparator 11 outputs the output signal S1, which is provided to a set terminal S of an RS-flip-flop (FF) circuit 12.

The set terminal S of the RS-FF circuit 12 is coupled to the output terminal of the comparator 11. An oscillator 13 is coupled to a reset terminal R of the RS-FF circuit 12. The oscillator 13 generates a clock signal CLK having a certain frequency (for example, a signal having pulses generated in fixed cycles). The RS-FF circuit 12 is a reset dominant circuit. When the clock signal CLK provided to the reset terminal R has an L level, the RS-FF circuit 12 outputs and holds an H level control signal S2 from its output terminal Q in response to the rising edge of the output signal S1 provided to its set terminal S. The RS-FF circuit 12 outputs an L level control signal S2 in response to the rising edge of the clock signal CLK. The control signal S2 output from the RS-FF circuit 12 is then provided to a drive circuit 14.

The drive circuit 14 uses the control signal S2 to generate the control signals DH and SL, which are used to activate and inactivate the transistors T1 and T2 of the conversion unit 2 in a complementary manner. The drive circuit 14 may set a dead time for the control signals DH and SL to prevent the transistors T1 and T2 from activating at the same time.

For example, the drive circuit 14 outputs an H level control signal DH and an L level control signal SL in response to an H level control signal S2. The drive circuit 14 outputs an L level control signal DH and an H level control signal SL in response to an L level control signal S2. The control signal DH output from the drive circuit 14 is provided directly to the gate of the main transistor T1. The transistor T1 is activated in response to an H level control signal DH, and is inactivated in response to an L level control signal DL.

The control signal SL output from the drive circuit 14 is provided to the second control circuit 30. The second control circuit 30 validates or invalidates the control signal SL and provides the control signal SL to the gate of the synchronous transistor T2 as the control signal DL. The transistor T2 is activated in response to an H level control signal DL and inactivated in response to an L level control signal DL.

The first comparison circuit 20 is used to detect overshooting of the output voltage Vo. A non-inversion input terminal of the first comparison circuit 20 is coupled to the output terminal Po and provided with the output voltage Vo. An inversion input terminal of the first comparison circuit 20 is provided with the second reference voltage Vr2, which is generated by a second reference power supply E2. The second reference voltage Vr2 is used as a reference value to detect overshooting of the output voltage Vo. The second reference voltage Vr2 is set to be higher than the target voltage (the target value) of the output voltage Vo.

The first comparison circuit 20 generates an output signal S3 corresponding to a comparison between the output voltage Vo and the second reference voltage Vr2. For example, the first comparison circuit 20 generates an L level output signal S3 when the output voltage Vo is lower than the second reference voltage Vr2. Further, the first comparison circuit 20 generates an H level output signal S3 when the output voltage Vo is higher than the second reference voltage Vr2. The output signal S3 output from the first comparison circuit 20 is provided to a set terminal S of an RS-FF circuit 22.

The second comparison circuit 21 is used to detect whether the coil current IL has reached a reference value (0 A in this example). An inversion input terminal of the second comparison circuit 21 is provided with the drain voltage of the synchronous transistor T2, or the voltage VLX at the node LX. A non-inversion input terminal of the second comparison circuit 21 is provided with the third reference voltage Vr3. The third reference voltage Vr3 is set at the ground voltage (0 V), which is the same as the source voltage of the synchronous transistor T2.

The second comparison circuit 21 generates an output signal S4 having a level corresponding to a comparison between the voltage VLX at the node LX and the third reference voltage Vr3. When the voltage VLX at the node LX is lower than the third reference voltage Vr3, for example, when the coil current IL flows from the ground toward the coil L1, the second comparison circuit 21 generates an H level output signal S4. When the voltage VLX is higher than the third reference voltage Vr3, for example, when the coil current IL flows reversely from the coil L1 toward the ground (or when the coil current IL flows from the input terminal Pi toward the coil L1), the second comparison circuit 21 generates an L level output signal S4. When the coil current IL becomes lower than 0 A, which occurs when the coil current IL starts flowing reversely from the coil L1 toward the ground, the voltage VLX at the node LX increases above the ground voltage (0 V). In this case, the second comparison circuit 21 generates an L level output signal S4 when the coil current IL reaches 0 A. The output signal S4 generated by the second comparison circuit 21 is then provided to an inverter circuit 23 and also to a NAND circuit 31 in the second control circuit 30.

The inverter circuit 23 outputs an inverted signal S5, which is generated by logically inverting the output signal S4, to a reset terminal R of the RS-FF circuit 22.

The RS-FF circuit 22 is a reset dominant circuit. When the inverted signal S5 provided to the reset terminal R has an L level, the RS-FF circuit 22 outputs an H level output signal S6 from its output terminal Q in response to the rising edge of the output signal S3 provided to its set terminal S. The RS-FF circuit 22 outputs an L level output signal S6 in response to the rising edge of the inverted signal S5. The output signal S6 output from the RS-FF circuit 22 is then provided to the NAND circuit 31.

The internal configuration of the second control circuit 30 will be described.

The NAND circuit 31 provides the AND circuit 32 with a control signal SG1 obtained from a logical negative AND operation of the output signal S4 and the output signal S6. When the second comparison circuit 21 is outputting an H level output signal S4, the output voltage Vo reaches the second reference voltage Vr2. This causes the first comparison circuit 20 to output an H level output signal S3. When the RS-FF circuit 22 then outputs an H level output signal S6, the NAND circuit 31 then outputs an L level control signal SG1.

When the coil current IL reaches 0 A and the second comparison circuit 21 outputs an L level output signal S4, the NAND circuit 31 outputs an H level control signal SG1.

The AND circuit 32 generates a control signal DL obtained from a logical AND operation of the control signal SL and the control signal SG1, and provides the control signal DL to the gate of the synchronous transistor T2. For example, the AND circuit 32 provides an L level control signal DL to the transistor T2 when the control signal SG1 has an L level irrespective of the signal level of the control signal SL. Thus, the AND circuit 32 constantly outputs an L level control signal DL for inactivating the synchronous transistor T2 when the control signal SG1 has an L level. In this case, the AND circuit 32 functions to invalidate the control signal SL. The L level control signal SG1 functions to invalidate the control signal SL.

When the control signal SG1 has an H level, the AND circuit 32 provides the control signal SL to the transistor T2 as the control signal DL. In this case, the AND circuit 32 functions to validate the control signal SL or validate an invalidated control signal SL. The H level control signal SG1 functions to validate the control signal SL or validate an invalidated control signal SL.

The step-down DC-DC converter 1 is an example of a power supply. The first reference voltage Vr1 is an example of a first reference value. The second reference voltage Vr2 is an example of a second reference value. The current value of 0 A is an example of a third reference value. The third reference value Vr3 is an example of a fourth reference value. The coil current IL is an example of a current. The H level output signal S3 is an example of a first detection signal. The L level output signal S4 is an example of a second detection signal.

Figure 2:
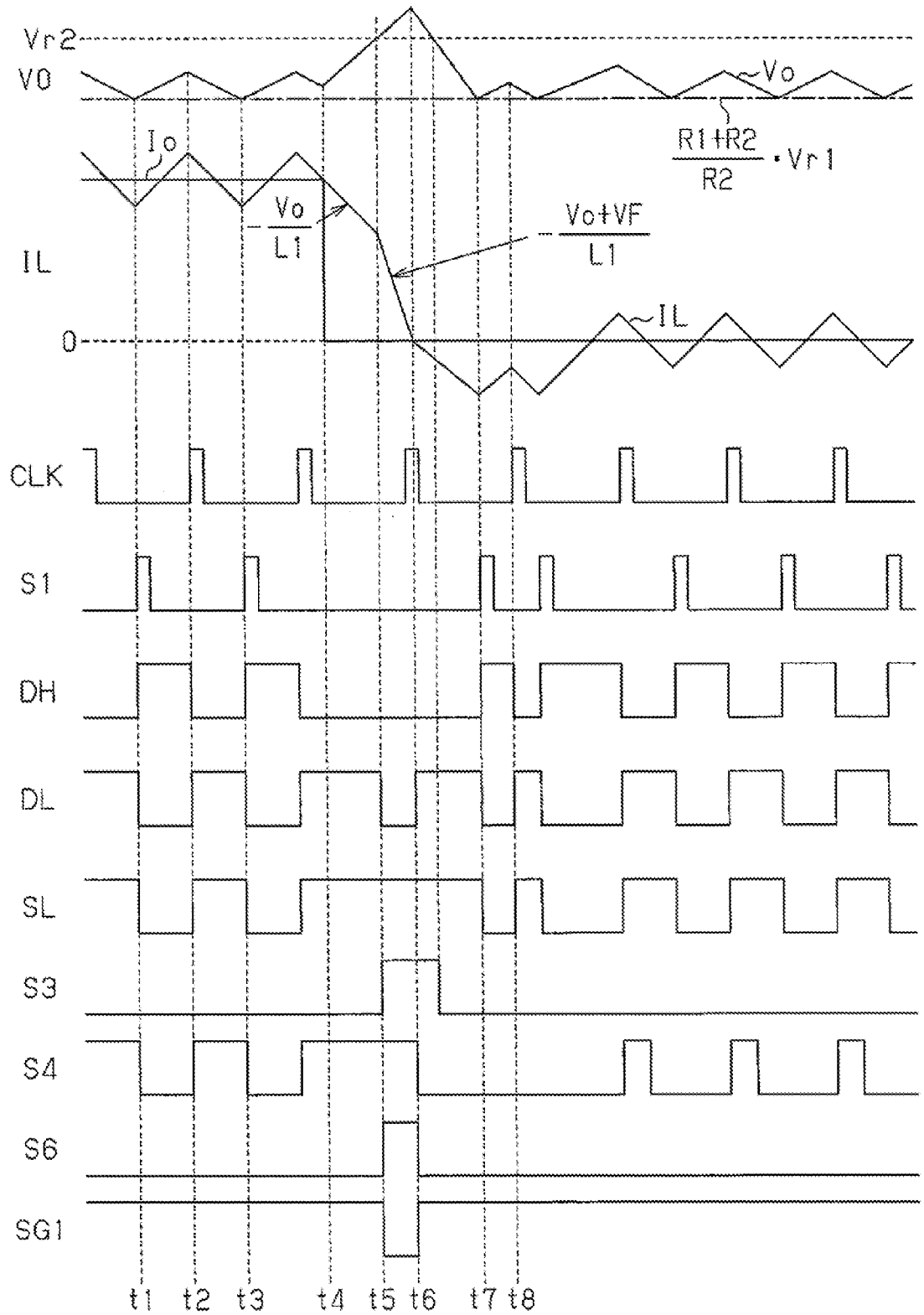
FIG. 2 is a timing chart illustrating the operation of the DC-DC converter in the first embodiment.
Figure 3A:
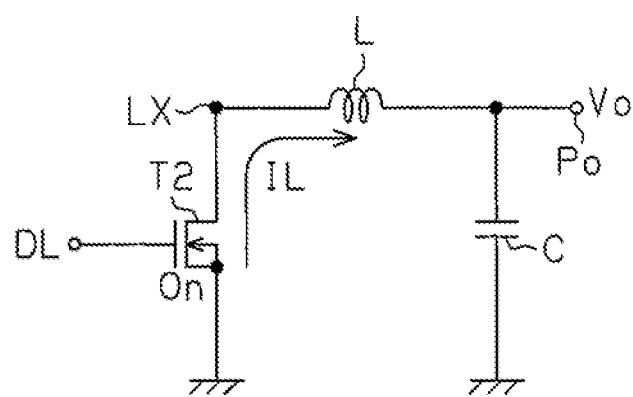
FIGS. 3A and 3B are diagrams describing the operation of the DC-DC converter in the first embodiment.
Figure 4:
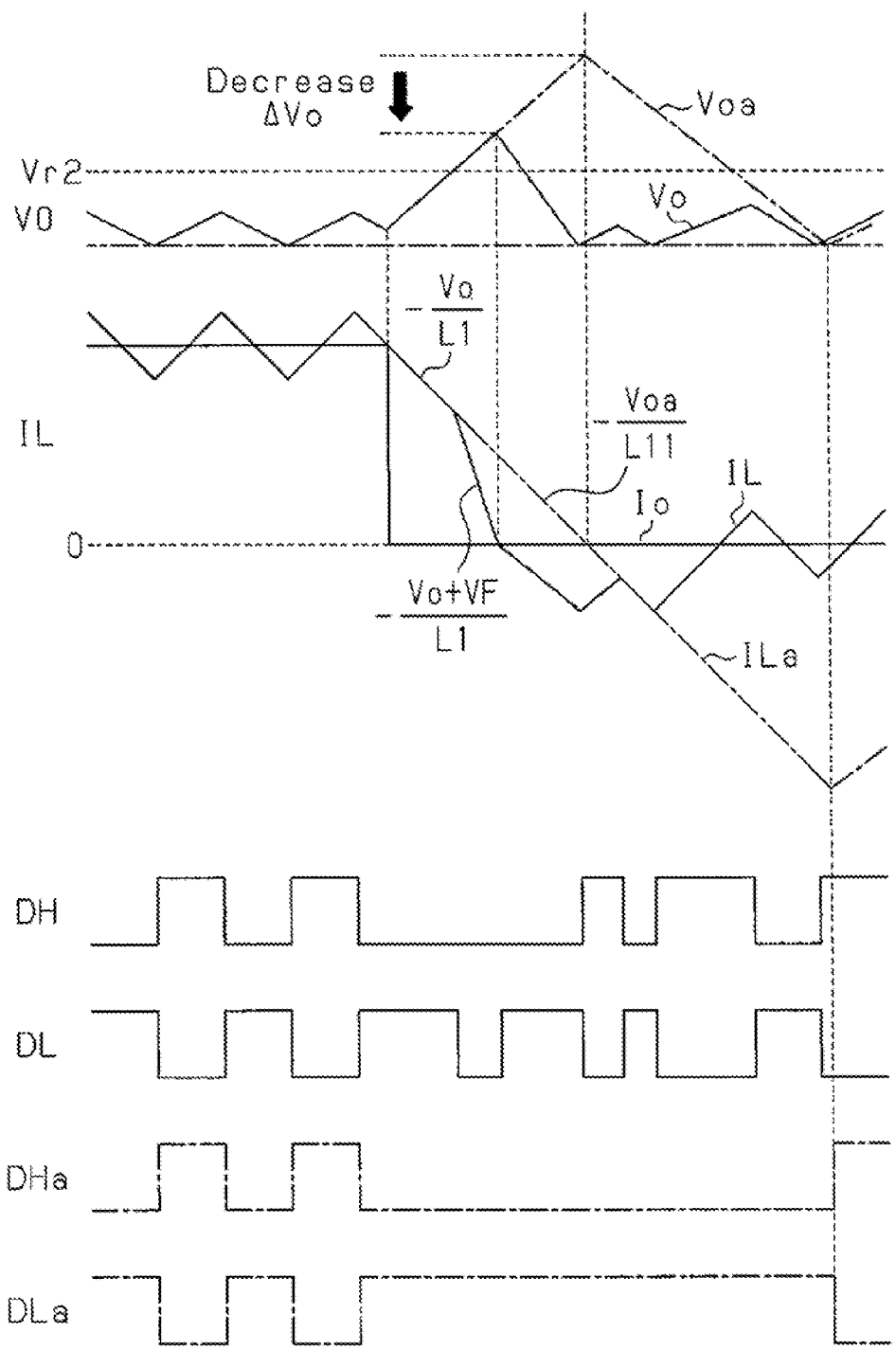
FIG. 4 is a timing chart illustrating the operation of the DC-DC converter in the first embodiment.
Figure 5:
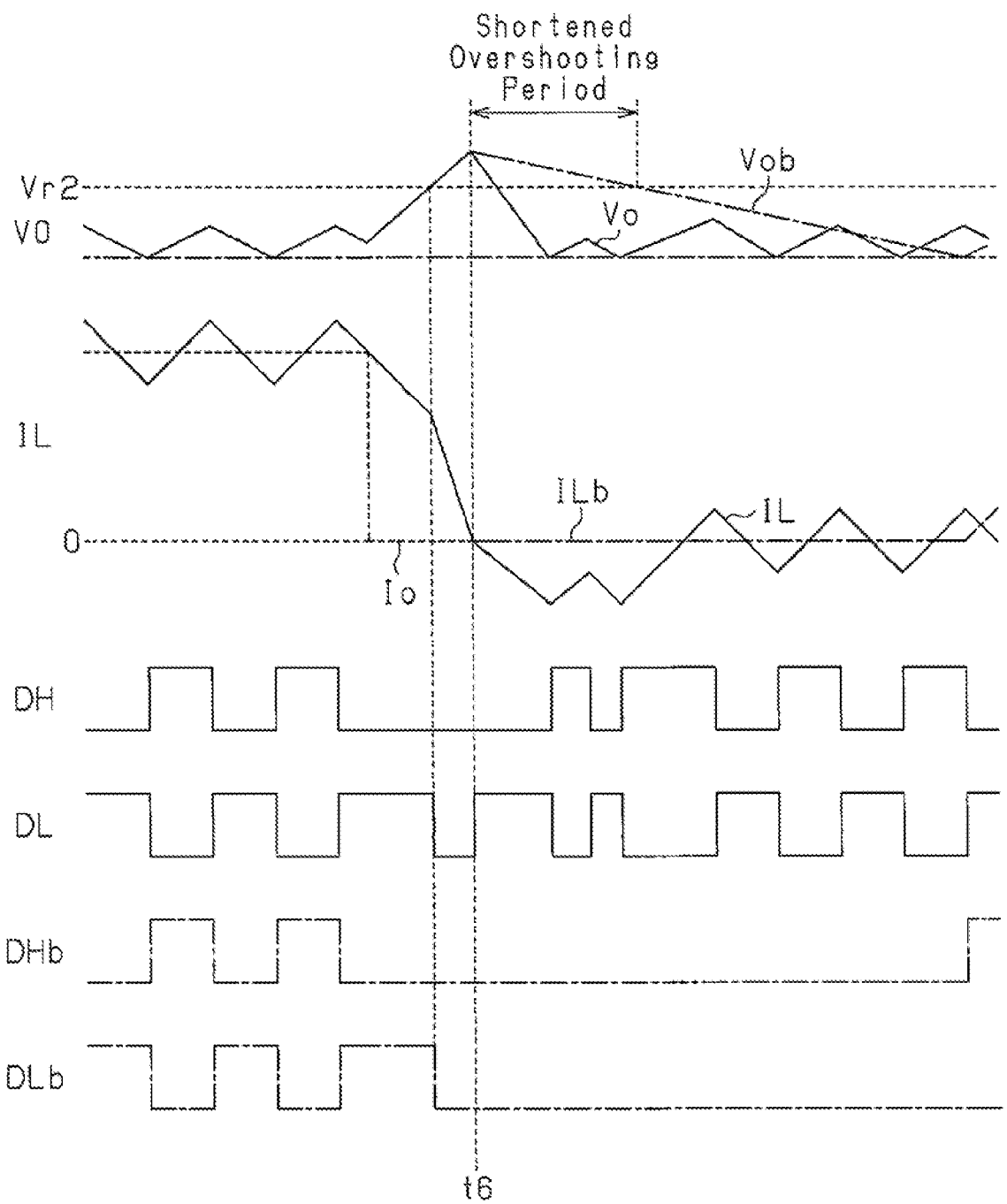
FIG. 5 is a timing chart illustrating the operation of the DC-DC converter in the first embodiment.

The operation of the step-down DC-DC converter 1 will be described with reference to FIGS. 2 to 5. In FIGS. 2, 4, and 5, the vertical axis and the horizontal axis are enlarged or reduced in scale to facilitate illustration.

The operation of the step-down DC-DC converter 1 performed in a steady state with a heavy load, in which a large amount of power needs to be supplied to the load, will first be described with reference to FIG. 2 (refer to the left part of the drawing).

In steady state in which the output voltage Vo and the input voltage Vi are maintained at a substantially constant state, the output voltage Vo is constantly lower than the second reference voltage Vr2 as illustrated in FIG. 2. In this case, the first comparison circuit 20 constantly outputs an L level output signal S3. The RS-FF circuit 22 also constantly outputs an L level output signal S6. As a result, the NAND circuit 31 outputs an H level control signal SG1, and thus the AND circuit 32 outputs the control signal SL to the synchronous transistor T2 as the control signal DL. For example, the second control circuit 30 in steady state functions to validate the control signal SL or enable the complementary switching of the transistors T1 and T2. The operation of the step-down DC-DC converter 1 in this steady state with a heavy load will be described in detail.

When the feedback voltage VFB becomes lower than the first reference voltage Vr1, the comparator 11 outputs an H level output signal S1 (timing t1). The RS-FF circuit 12 outputs an H level control signal S2 to the drive circuit 14 in response to the rising edge of the output signal S1. The drive circuit 14 outputs an H level control signal DH and an L level control signal SL in response to the H level control signal S2. In response to the L level control signal SL, the AND circuit 32 outputs an L level control signal DL to the synchronous transistor T2. In this case, the main transistor T1 is activated in response to the H level control signal DH. The synchronous transistor T2 is inactivated in response to the L level control signal DL. Activation of the main transistor T1 forms a passage in which current flows from the input terminal Pi to the output terminal Po via the coil L1. This gradually increases the coil current IL flowing through the coil L1 and accumulates energy in the coil L1. As a result, the output voltage Vo (the feedback voltage VFB) gradually increases (timings t1 to t2).

Subsequently, the oscillator 13 outputs an H level clock signal CLK in fixed cycles (timing t2). The RS-FF circuit 12 outputs an L level control signal S2 in response to the rising edge of the clock signal CLK. The drive circuit 14 outputs an L level control signal DH and an H level control signal SL in response to the L level control signal S2. In response to the H level control signal SL, the AND circuit 32 outputs an H level control signal DL to the synchronous transistor T2. The main transistor T1 is inactivated in response to the L level control signal DH. The synchronous transistor T2 is activated in response to the H level control signal DL. Activation of the synchronous transistor T2 forms a passage in which current flows from the ground to the output terminal Po. This decreases the coil current IL flowing through the current passage and releases the energy accumulated in the coil L1 toward the output terminal Po. As a result, the output voltage Vo (the feedback voltage VFB) decreases gradually (timings t2 to t3).

When the feedback voltage VFB becomes lower than the first reference voltage Vr1, the comparator 11 outputs an H level output signal S1 (timing t3). The control circuit 3 outputs an H level control signal DH and an L level control signal DL. As a result, the main transistor T1 is activated, and the synchronous transistor T2 is inactivated. Thus, the output voltage Vo gradually increases again. The complementary switching of the transistors T1 and T2 described above maintains the output voltage Vo at the target voltage (target value), which is determined in accordance with the first reference voltage Vr1.

The operation of the DC-DC converter 1 performed when the state of the load coupled to the output terminal Po changes suddenly and the output current Io flowing through the load decreases rapidly will be described.

When the output current Io decreases rapidly from a high current state to 0 A (timing t4), the energy accumulated in the coil L1 becomes excessive. The excess energy charges the capacitor C1. As a result, the output voltage Vo increases rapidly and starts overshooting. In this case, the output voltage Vo is significantly higher than the target voltage (the target value), which is determined in accordance with the first reference voltage Vr1. After the oscillator 13 outputs an H level clock signal CLK, the RS-FF circuit 12 is maintained in a reset state. As a result, the control circuit 3 outputs an L level control signal DH and an H level control signal DL. The main transistor T1 is inactivated, and the synchronous transistor T2 is activated. Activation of the transistor T2 forms a passage in which current flows from the ground to the output terminal Po as illustrated in FIG. 3A. This gradually decreases the coil current IL flowing through the current passage, and gradually decreases the amount of current flowing through the output terminal Po. In this case, the coil current IL changes along a gradient of −Vo/L1.

When the rapidly increasing output voltage Vo exceeds the second reference voltage Vr2 as illustrated in FIG. 2 (timing t5), the first comparison circuit 20 outputs an H level output signal S3. Here, the state of the output current Io has been changed rapidly from a high current state to a low current state. In this case, the coil current IL flowing through the coil L1 flows from the ground toward the output terminal Po. In this state, the synchronous transistor T2 is activated. The second comparison circuit 21 then outputs an H level output signal S4. The RS-FF circuit 22 is set in response to the rising edge of the output signal S3, and outputs an H level output signal S6. In response to the H level output signal S6, the NAND circuit 31 outputs an L level control signal SG1. As a result, the AND circuit 32 outputs a control signal DL at an L level irrespective of the signal level of the control signal SL. For example, in response to an H level output signal S3 output from the first comparison circuit 20 when the output voltage Vo reaches the second reference voltage Vr2, the second control circuit 30 invalidates the control signal SL or disables the complementary switching of the transistors T1 and T2 and generates an L level control signal DL for inactivating the transistor T2. As a result, the synchronous transistor T2 is inactivated, and the transistors T1 and T2 are both inactivated.

Figure 3B:
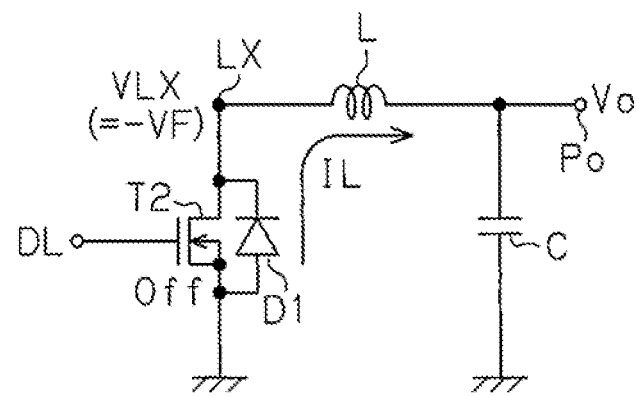

As illustrated in FIG. 3B, the current IL flowing through the synchronous transistor T2 flows toward the output terminal Po through a body diode D1 included in the synchronous transistor T2. The voltage VLX at the node LX is expressed by the following equation. In the equation, VF is a forward step-down voltage of the body diode D1.

$$VLX = -VF \quad (2)$$

In this case, the coil current IL changes along a gradient of $-(Vo+VF)/L1$, which is greater than the gradient representing the change of the coil current IL during the activated period of the synchronous transistor T2 (for example the timings t4 to t5). This control rapidly decreases the amount of current flowing through the output terminal Po and decreases the amount ΔVo of overshoot of the output voltage Vo from the sudden change of the load state. For example, the control for changing the coil current IL with a greater gradient decreases the overshooting amount ΔVo of the output voltage Vo more than the control executed in the conventional circuit in which the synchronous transistor T12 is continuously activated until the overshooting output voltage Voa decreases to the target voltage (the target value), or in which the coil current ILa constantly changes along the gradient of $-Voa/L11$.

The overshooting amount ΔVo of the output voltage Vo of the step-down DC-DC converter 1 in the first embodiment may be roughly determined using the following equation.

$$\Delta Vo = \frac{\Delta Io \times t}{2 \times C1} \quad (3)$$

whereas $$t = \frac{L1 \times \Delta Io}{Vo + VF}$$

As apparent from equation 3 and equation 1, the inactivation of the synchronous transistor T2 decreases the overshooting amount ΔVo of the output voltage Vo more than the conventional circuit.

As illustrated in FIG. 2, when the coil current IL reaches 0 A (timing t6), or when the voltage VLX at the node LX crosses the third reference voltage Vr3, the second comparison circuit 21 outputs an L level output signal S4. The RS-FF circuit 22 is reset in response to the rising edge of the inverted signal S5 output from the inverter circuit 23. The RS-FF circuit 22 then outputs an L level output signal S6. As a result, the NAND circuit 31 outputs an H level control signal SG1. The AND circuit 32 then outputs the control signal SL as the control signal DL. For example, the second control circuit 30 validates the control signal SL and resumes the complementary switching of the transistors T1 and T2 in response to the L level output signal S4, which is output from the second comparison circuit 21 when the coil current IL reaches 0 A. In other words, the second control circuit 30 enables the complementary switching of the transistors T1 and T2 from the disabled state in response to the L level output signal S4.

When the feedback voltage VFB has not been decreased to the first reference voltage Vr1, the drive circuit 14 outputs an H level control signal SL. In this case, an H level control signal DL is provided to the synchronous transistor T2. The synchronous transistor T2 is activated in response to the H level control signal DL. This allows the coil current IL to flow reversely from the coil L1 toward the ground, and the excess energy accumulated in the capacitor C1 is discharged to the input side via the coil L1. In this manner, the overshooting output voltage Vo decreases rapidly. The input side includes, for example, the node LX between the input terminal Pi and the ground.

In a comparative example, the transistors T1 and T2 are both inactivated when the output voltage Vo increases above the second reference voltage Vr2. The switching of the transistors T1 and T2 is resumed when the output voltage Vo subsequently decreases to the target voltage (the target value). The operation of the DC-DC converter in this comparative example will be described. In FIG. 5, DHb is a control signal provided to the main transistor T11 of the comparative example, DLb is a control signal provided to the synchronous transistor T2 of the comparative example, ILb is a coil current used in the comparative example, and Vob is an output voltage in the comparative example. When the transistors T1 and T2 are both inactivated in response to the L level control signals DLb and DHb, as illustrated in FIG. 5, the coil current ILb flows toward the output terminal Po through the body diode included in the transistor T2. When the transistor T2 is maintained in an inactivated state in response to the L level control signal DLb after the coil current ILb reaches 0 A (timing t6), no coil current ILb flows reversely toward the input side via the body diode. When the output current Io is decreasing, the time taken to lower the overshooting output voltage Vob is lengthened. This consequently lengthens the period in which the output voltage Vob is overshooting.

In contrast, the control circuit 3 of the first embodiment resumes the switching (the PWM operation) of the transistors T1 and T2 to activate the synchronous transistor T2 when the coil current IL reaches 0 A. This allows the coil current IL to flow reversely toward the input side and rapidly decreases the output voltage Vo. Thus, the period in which the output voltage Vo is overshooting is shortened as compared with the comparative example.

As illustrated in FIG. 2, the output voltage Vo decreases through the operation described above (timings t6 to t7). When the feedback voltage VFB becomes lower than the first reference voltage Vr1, the comparator 11 outputs an H level output signal S1 (timing t1). As a result, the control circuit 3 outputs an H level control signal DH and an L level control signal DL. Thus, the main transistor T1 is activated, and the synchronous transistor T2 is inactivated. When the oscillator 13 subsequently outputs an H level clock signal CLK (timing t8), the main transistor T1 is inactivated and the synchronous transistor T2 is activated. Such switching of the transistors T1 and T2 is repeated to converge the output voltage Vo to the target voltage (the target value), which is determined in accordance with the first reference voltage Vr1. Thus, the DC-DC converter operates in a no-load state in substantially the same manner as in steady state with a heavy load.

The first embodiment has the advantages described below.

(1) When the output voltage Vo reaches the second reference voltage Vr2, the complementary switching of the transistors T1 and T2 is disabled and the transistor T2 is inactivated. This changes the coil current IL at a greater degree and decreases the overshooting amount ΔVo of the output voltage Vo.

(2) When the coil current IL reaches 0 A, the complementary switching of the transistors T1 and T2 is enabled to recover to the normal operation of the DC-DC converter. As a result, the transistor T2 is activated to allow the coil current IL to flow reversely. This efficiently discharges excess energy from the capacitor C1. As a result, the overshooting output voltage Vo decreases rapidly. This shortens the period in which the output voltage Vo is overshooting.

Second Embodiment

A second embodiment of the present invention will be described with reference to FIGS. 6 to 12. A step-down DC-DC converter is of the second embodiment differs from the converter of the first embodiment in that it operates in a pulse frequency modulation (PFM) mode (or a pulse skip mode) in a steady state and inactivates a synchronous transistor T2 when a reverse flow of a coil current IL is detected in the PFM mode. The differences from the first embodiment will be described below. Like or same reference numerals are given to those components that are the same as the corresponding components illustrated in FIGS. 1 to 5. Such components will not be described in detail.

Figure 6:
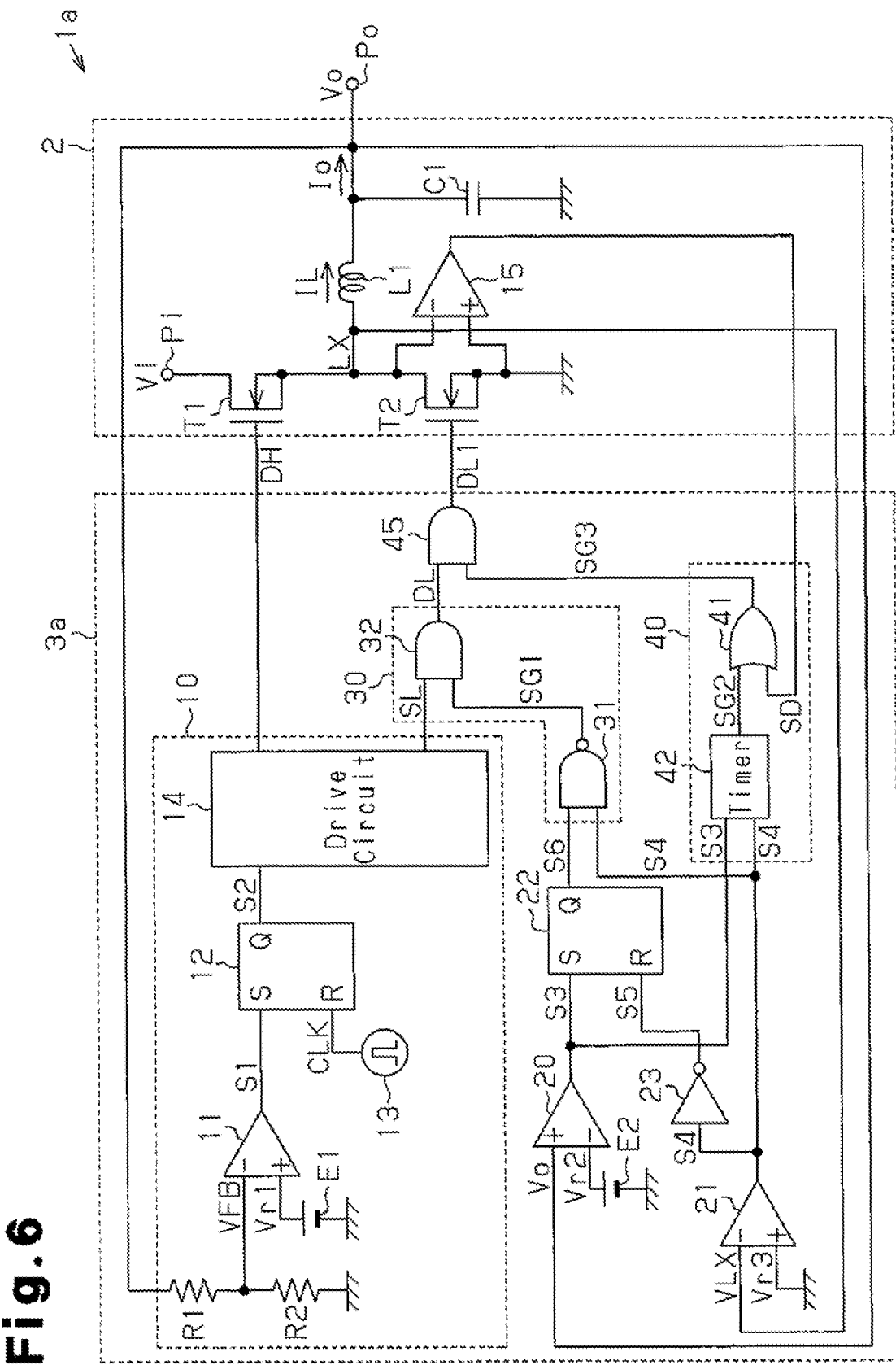
FIG. 6 is a block circuit diagram of a DC-DC converter according to a second embodiment.

As illustrated in FIG. 6, the two terminals of a synchronous transistor T2 are coupled to a reverse current detection comparator 15. An inversion input terminal of the comparator 15 is coupled to the drain of the transistor T2. A non-inversion input terminal of the comparator 15 is coupled to the source of the transistor T2. The comparator 15 detects a coil current IL flowing through a coil L1 based on the potential at the source and the potential at the drain of the transistor T2. The comparator 15 outputs an H level or L level detection signal SD to an OR circuit 41 of a third control circuit 40 in accordance with the detection result. For example, the comparator 15 outputs an H level detection signal SD that activates the transistor T2 when a voltage VLX at a node LX is lower than the ground level, for example, when the coil current IL flows from the ground toward an output terminal Po. The comparator 15 outputs an L level detection signal SD for inactivating the transistor T2 when the voltage VLX is higher than the ground level, for example, when the coil current IL flows reversely from the coil L1 toward the ground (or when the coil current IL flows from an input terminal Pi toward the coil L1). Although not illustrated in FIG. 6, the comparator 15 is an element of a control circuit 3a.

The third control circuit 40 invalidates the detection signal SD of the comparator 15 for a certain period from when the coil current IL reaches 0 A after the output voltage Vo becomes greater than a second reference voltage Vr2. A timer circuit 42 in the third control circuit 40 is provided with an output signal S3 from a first comparison circuit 20 and an output signal S4 from a second comparison circuit 21. The timer circuit 42 generates an H level control signal SG2 until detecting the falling edge of the output signal S4 from the second comparison circuit 21 twice after receiving an H level output signal S3 from the first comparison circuit 20.

An OR circuit 41 outputs a control signal SG3 obtained from a logical OR operation of the detection signal SD from the comparator 15 and the control signal SG2 from the timer circuit 42 to an AND circuit 45. In detail, the OR circuit 41 outputs the detection signal SD to the AND circuit 45 as the control signal SG3 when the control signal SG2 has an L level. However, the OR circuit 41 outputs an H level control signal SG3 when the control signal SG2 has an H level irrespective of the signal level of the detection signal SD. For example, the OR circuit 41 functions to invalidate the detection signal SD for a certain period from when the output signal S3 from the first comparison circuit 20 shifts to an H level. The H level control signal SG2 functions to invalidate the detection signal SD.

The AND circuit 45 is provided with a control signal DL from an AND circuit 32 in addition to the control signal SG3 from the third control circuit 40 (the OR circuit 41). The AND circuit 45 generates a control signal DL1 obtained from a logical AND operation of the control signal SG3 and the control signal DL and provides the control signal DL1 to the gate of the synchronous transistor T2. For example, the AND circuit 45 provides the control signal DL to the transistor T2 as the control signal DL1 when the control signal SG3 has an H level. However, the AND circuit 45 provides an L level control signal DL1 to the transistor T2 when the control signal SG3 has an L level irrespective of the signal level of the control signal DL.

The step-down DC-DC converter is an example of a power supply. The reverse current detection comparator 15 is an example of a reverse current detection circuit. The timer circuit 42 is an example of a signal generation circuit.

The internal configuration of the timer circuit 42 will be described.

Figure 7:
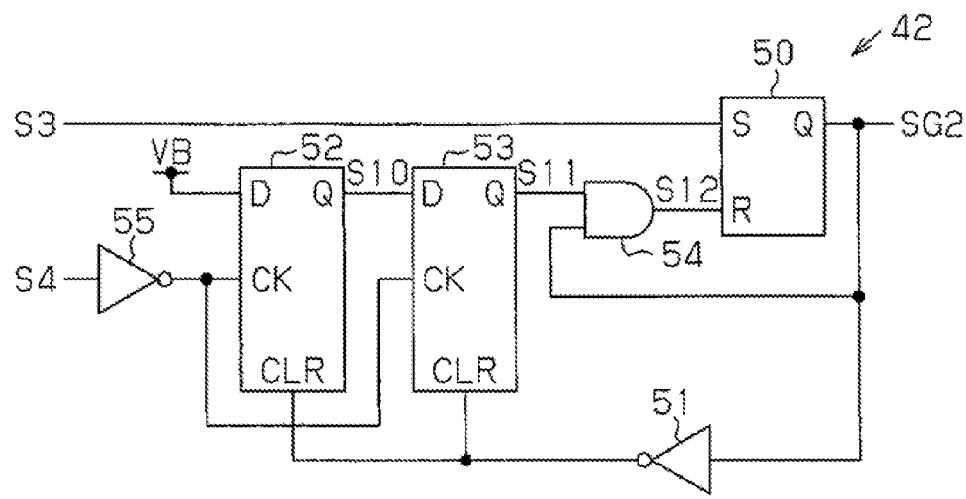
FIG. 7 is a circuit diagram illustrating an internal configuration of a timer circuit.

As illustrated in FIG. 7, the output signal S3 from the first comparison circuit 20 is provided to a set terminal S of a reset dominant RS-FF circuit 50. The control signal SG2 is output from an output terminal Q of the RS-FF circuit 50. The control signal SG2 is provided to clear terminals CLR of D-FF circuits 52 and 53 via an inverter circuit 51. The control signal SG2 is also provided to an AND circuit 54.

The D-FF circuits 52 and 53 that are coupled in series each have a clock terminal CK provided with the output signal S4 of the second comparison circuit 21. A bias voltage VB is provided to an input terminal D of the D-FF circuit 52. The bias voltage VB may be, for example, a high-potential power supply voltage generated by a power supply circuit (not illustrated) or an input voltage Vi. An output signal S10 from the D-FF circuit 52 is provided to an input terminal D of the D-FF circuit 53 subsequent to the D-FF circuit 52. The D-FF circuit 52 samples the signal (the bias voltage VB) provided to the input terminal D in response to the rising edge of the signal provided to the clock terminal CK (the falling edge of the output signal S4), and outputs the sampled signal as the output signal S10. For example, the D-FF circuit 52 outputs the output signal S10 at the level of the bias voltage VB (H level). The D-FF circuit 52 also outputs an L level output signal S10 in response to an H level signal (an L level control signal SG2) provided to its clear terminal CLR.

An output signal S11 from the D-FF circuit 53 is provided to the AND circuit 54. The D-FF circuit 53 samples the output signal S10 provided to the input terminal D in response to the rising edge of the signal provided to the clock terminal CK (the falling edge of the output signal S4) and outputs the sampled signal as the output signal S11. The D-FF circuit 53 outputs an L level output signal S11 in response to an H level signal provided to its clear terminal CLR (an L level control signal SG2).

The AND circuit 54 generates an output signal S12 obtained from a logical AND operation of the output signal S11 and the control signal SG2. Further, the AND circuit 54 outputs the output signal S12 to the reset terminal R of the RS-FF circuit 50.

Figure 8:
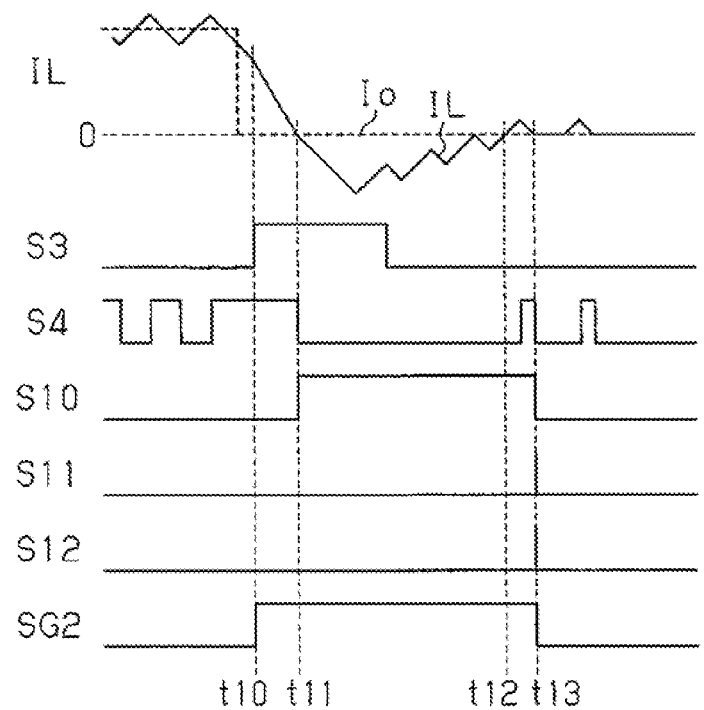
FIG. 8 is a timing chart illustrating the operation of the timer circuit.
Figure 9:
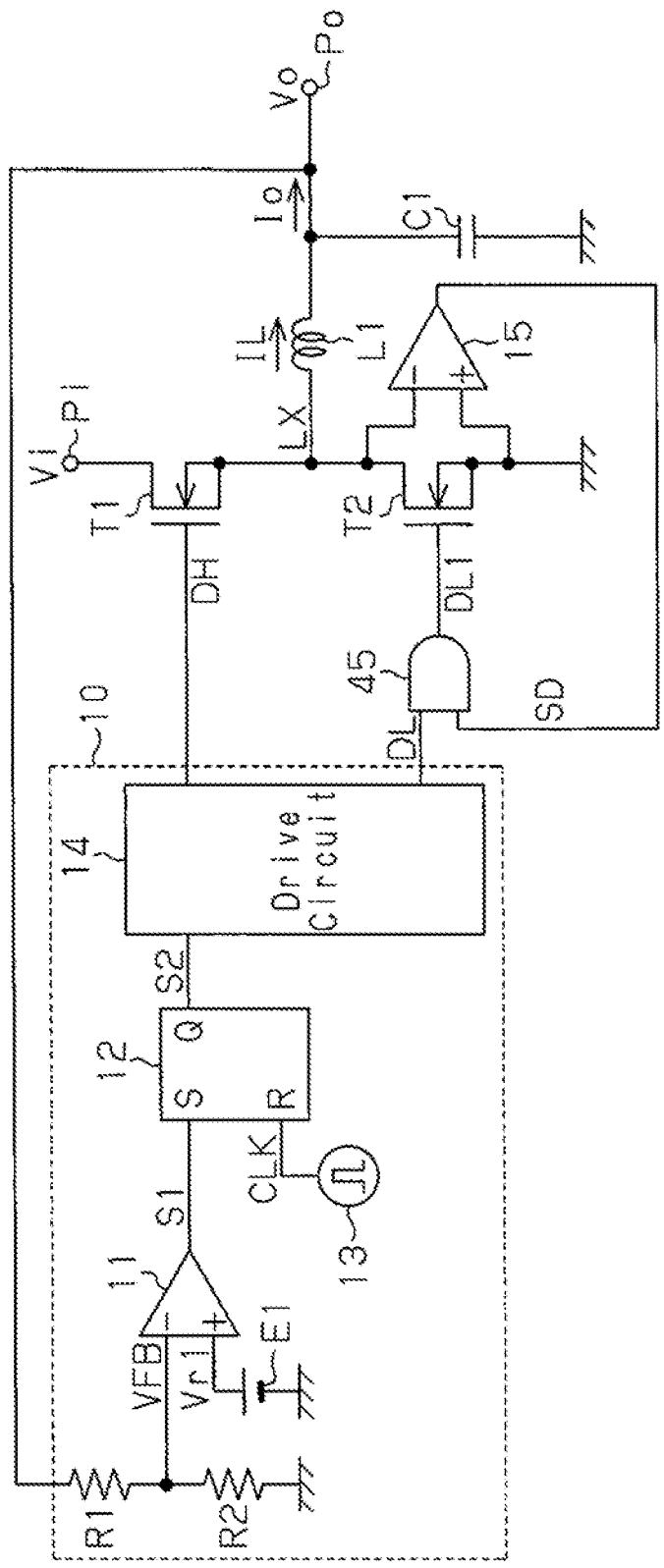
FIG. 9 is a block circuit diagram of the DC-DC converter in a PFM mode.

The operation of the timer circuit 42 will be described with reference to FIG. 8. In FIG. 8, the vertical axis and the horizontal axis are enlarged or reduced in scale to facilitate illustration.

The first comparison circuit 20 outputs an H level output signal S3 when the output voltage Vo becomes greater than the reference voltage Vr2 (refer to timing t1) as illustrated in FIG. 8. The RS-FF circuit 50 is set in response to the rising edge of the output signal S3. The RS-FF circuit 50 then outputs an H level control signal SG2. Subsequently, the coil current IL reaches 0 A, and the output signal S4 from the second comparison circuit 21 falls (refer to timing t11). Then, the D-FF circuit 52 outputs an H level (the level of the bias voltage VB) output signal S10. During the period in which the control signal SG2 has an H level, the OR circuit 41 invalidates the detection signal SD of the reverse current detection comparator 15 (refer to FIG. 6). During this period, the coil current IL is allowed to flow reversely toward the input side.

Subsequently, the coil current IL becomes greater THAN 0 A (timing t12) and then decreases again to 0 A. As a result, the output signal S4 from the second comparison circuit 21 falls to an L level (timing t13). The D-FF circuit 53 then samples the H level output signal S10 from the D-FF circuit 52 and outputs the sampled signal to the AND circuit 54 as the output signal S11. The AND circuit 54 generates an H level output signal S12 based on the H level output signal S11 and the H level control signal SG2. Then, the AND circuit 54 outputs the output signal S12 to the reset terminal R of the RS-FF circuit 50. The RS-FF circuit 50 is then reset in response to the rising edge of the output signal S12. The control signal SG2 output from the RS-FF circuit 50 then falls to an L level. The D-FF circuits 52 and 53 are then cleared in response to the falling edge of the control signal SG2. As a result, the output signals S10 and S11 from the D-FF circuits 52 and 53 fall to an L level, and the output signal S12 from the AND circuit 54 falls to an L level.

As described above, the H level control signal SG2 is generated until the falling edge of the output signal S4 of the second comparison circuit 21 is detected twice after the H level output signal S3 is input from the first comparison circuit 20.

Figure 12:
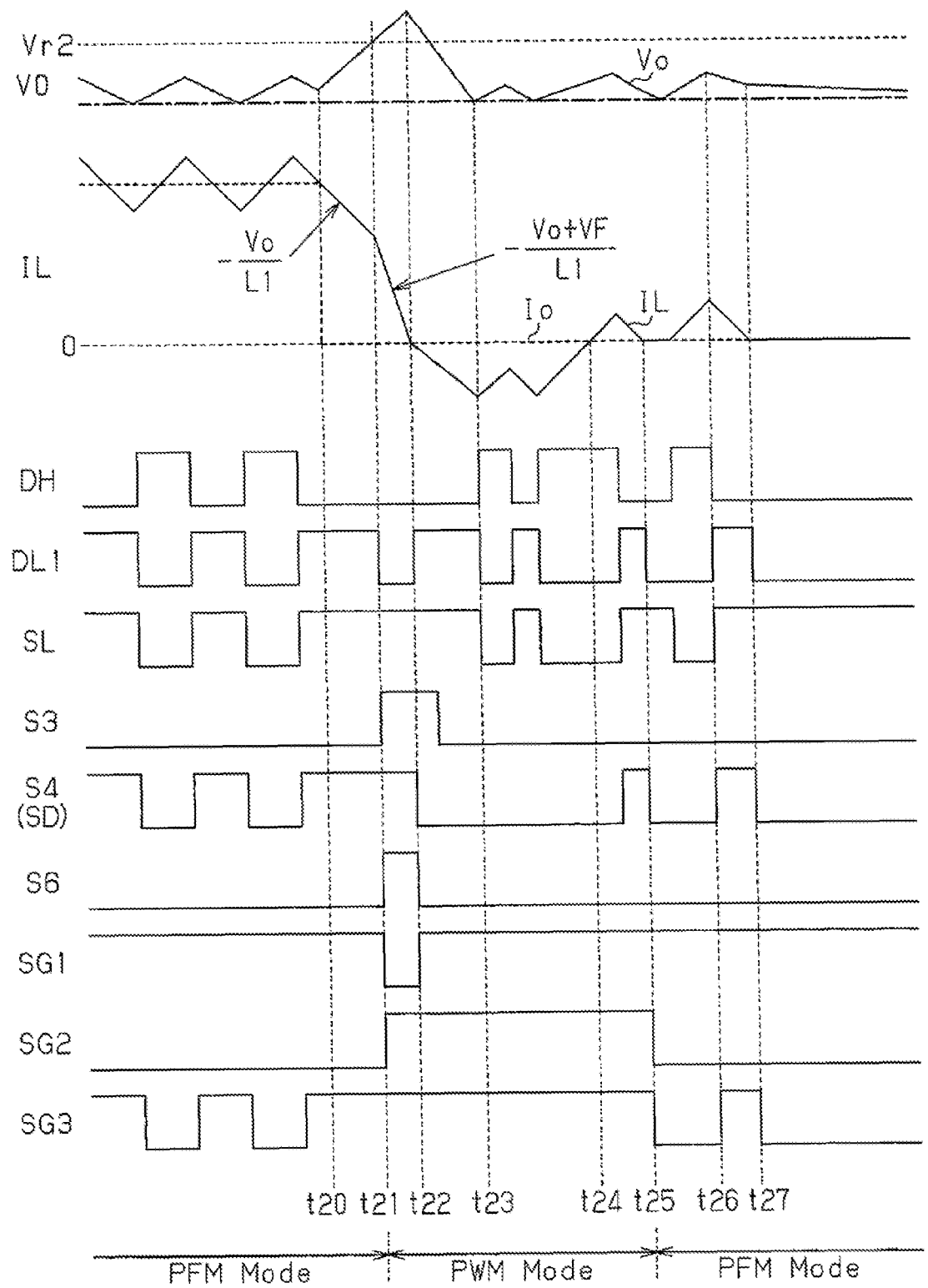
FIG. 12 is a timing chart illustrating the operation of the DC-DC converter in the second embodiment.

The operation of the step-down DC-DC converter is will be described with reference to FIGS. 9 to 12. In FIG. 12, the vertical axis and the horizontal axis are enlarged or reduced as required in scale to facilitate illustration.

The operation of the step-down DC-DC converter is performed in steady state with a heavy load, in which the peak value of the output current Io is high, will be described in detail (refer to left part in FIG. 12).

In steady state, the output voltage Vo is constantly lower than the second reference voltage Vr2 as illustrated in FIG. 12. In this case, the first comparison circuit 20 constantly outputs an L level output signal S3. The RS-FF circuit 22 also constantly outputs an L level output signal S6. As a result, the NAND circuit 31 outputs an H level control signal SG1, and thus the AND circuit 32 outputs the control signal SL to the synchronous transistor T2 as the control signal DL. Also, the control signal SG2 of the timer circuit 42 is constantly at an L level in response to the L level output signal S3. The OR circuit 41 thus outputs the detection signal SD of the comparator 15 to the AND circuit 45 as the control signal SG3. As a result, the step-down DC-DC converter is in the steady state changes to the circuit illustrated in FIG. 9 in a simulated manner and operates in the PFM mode.

However, the peak value of the output current Io is high in the heavy load state as illustrated in FIG. 12. Although the coil current IL decreases gradually during the inactivated period of the main transistor T1, the coil current IL does not reach 0 A. In the inactivated period of the main transistor T1, the comparator 15 constantly outputs an H level detection signal SD. As a result, the control signal SL output from the drive circuit 14 is constantly provided to the synchronous transistor T2 as the control signal DL1. In other words, the step-down DC-DC converter is in the heavy load state operates in substantially the same manner as the step-down DC-DC converter 1 in the heavy load state according to the first embodiment.

The operation performed when the load state changes suddenly and the output current Io flowing through the load decreases rapidly will be described.

When the output current Io decreases rapidly from its high current state to 0 A (timing t20), the output voltage Vo increases rapidly and starts overshooting. In this case, the output voltage Vo is significantly higher than the target voltage (the target value) determined in accordance with the first reference voltage Vr1. After the oscillator 13 outputs an H level clock signal CLK, the RS-FF circuit 12 is maintained to be reset. As a result, the control circuit 3a outputs an L level control signal DH and an H level control signal DL1. The main transistor T1 is inactivated, and the synchronous transistor T2 is activated. Activation of the transistor T2 causes the amount of the coil current IL flowing through the output terminal Po to decrease gradually.

When the rapidly increasing output voltage Vo exceeds the second reference voltage Vr2 (timing t21), the first comparison circuit 20 outputs an H level output signal S3. The timer circuit 42 outputs an H level control signal SG2 in response to the rising edge of the output signal S3. Thus, the H level control signal SG3 is provided to the AND circuit 45 irrespective of the detection signal SD of the comparator 15. This invalidates the detection signal SD and allows the coil current IL to flow reversely. In other words, the step-down DC-DC converter is operates in the PWM mode in response to the H level control signal SG2.

When the output signal S3 shifts to an H level as described above, the second comparison circuit 21 is outputting an H level output signal S4. Thus, the RS-FF circuit 22 outputs an H level output signal S6 in response to the rising edge of the output signal S3. In response to the H level output signal S6, the NAND circuit 31 outputs an L level control signal SG1, and the AND circuit 32 thus outputs a control signal DL at an L level irrespective of the signal level of the control signal SL. As a result, the AND circuit 45 provides the control signal DL fixed at the L level to the synchronous transistor T2 as the control signal DL1. The step-down DC-DC converter is changes to the circuit illustrated in FIG. 10 in a simulated manner and operates in the same manner as the step-down DC-DC converter 1 according to the first embodiment.

Figure 10:
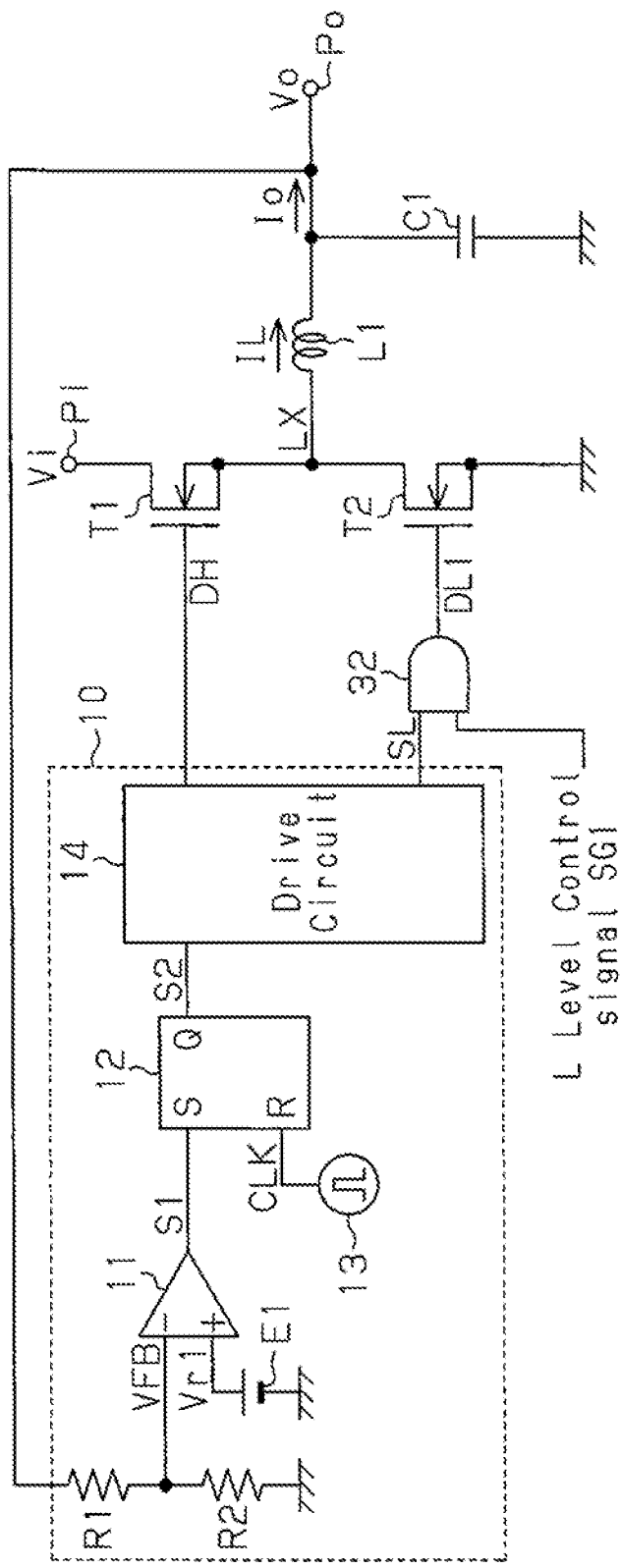
FIG. 10 is a block circuit diagram of the DC-DC converter in which the switching of transistors is disabled.
Figure 11:
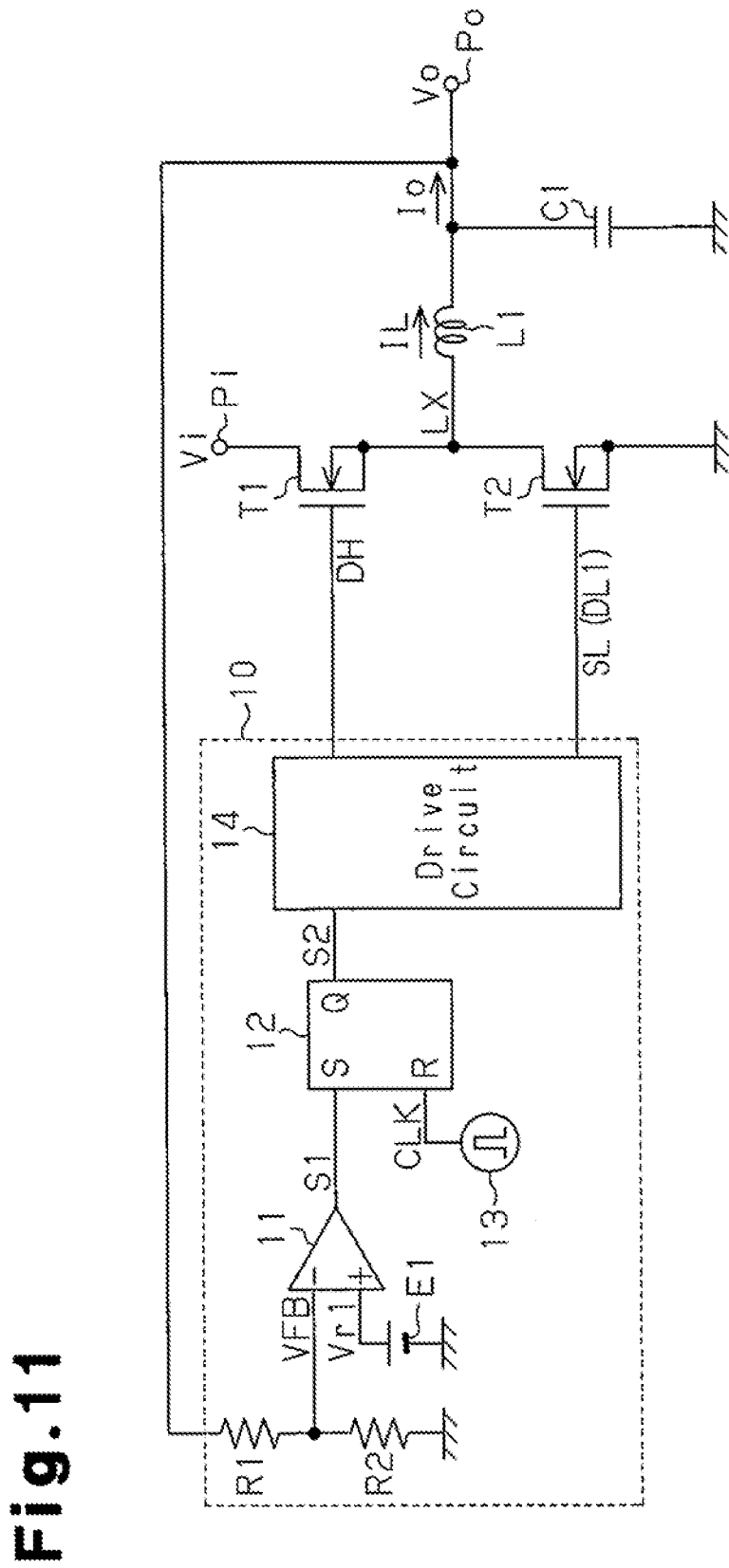
FIG. 11 is a block circuit diagram of the DC-DC converter in a PWM mode.

In detail, as illustrated in FIG. 10, the L level control signal SG1 invalidates the control signal SL or disables the complementary switching of the transistors T1 and T2. The transistor T2 is inactivated in response to the control signal DL1 fixed at the L level. As a result, the transistors T1 and T2 are both inactivated. The resulting voltage VLX at the node LX is expressed by the following equation.

$$VLX = -VF \qquad (4)$$

As a result, the coil current IL changes along the gradient of $-(Vo+VF)/L1$. The inactivation of the transistor T2 in this manner enables the coil current IL to change along a gradient that is greater than the gradient representing the change of the coil current in the activated period of the transistor T2. This decreases the amount $\Delta Vo$ of overshooting of the output voltage Vo from the sudden change of the load.

Subsequently, when the coil current IL reaches 0 A (timing t22), the second comparison circuit 21 outputs an L level output signal S4. As a result, the NAND circuit 31 outputs an H level control signal SG1, and the AND circuit 32 outputs the control signal SL as the control signal DL. For example, the second control circuit 30 validates the invalidated control signal SL and resumes the complementary switching of the transistors T1 and T2. In this case, the timer circuit 42 is continuously outputting an H level control signal SG2. The AND circuit 45 is thus provided with an H level control signal SG3 irrespective of the signal level of the detection signal SD of the comparator 15. This invalidates the PFM mode for inactivating the synchronous transistor T2 in response to detection of the reverse flow of the coil current IL. The control signal SL output from the drive circuit 14 is then provided to the synchronous transistor T2 as the control signal DL1. In other words, the coil current IL is allowed to flow reversely toward the input side during the period in which the control signal SG2 has an H level after the control signal SL is validated. In this manner, the step-down DC-DC converter is changes to the circuit illustrated in FIG. 11 in a simulated manner and operates in the PWM mode in the same manner as the step-down DC-DC converter 1 of the first embodiment.

In detail, when the disablement of the control signal SL is released (timing t22), the drive circuit 14 is outputting an H level control signal SL before the feedback voltage VFB decreases to the first reference voltage Vr1. In this case, the transistor T2 is provided with an H level control signal DL1 and is activated. This allows the coil current IL to flow reversely from the coil L1 toward the ground and enables the excess energy accumulated in the capacitor C1 to be discharged to the input side via the coil L1. In this manner, the overshooting output voltage Vo decreases rapidly.

Through the operation described above, the output voltage Vo decreases and the feedback voltage VFB becomes lower than the first reference voltage Vr1. As a result, the control circuit 3a outputs an H level control signal DH and an L level control signal DL1 (timing t23). In response to these signals, the main transistor T1 is activated and the synchronous transistor T2 is inactivated. Subsequently, the oscillator 13 outputs an H level clock signal CLK. As a result, the main transistor T1 is inactivated, and the synchronous transistor T2 is activated.

Such switching of the transistors T1 and T2 is repeated, and the coil current IL first becomes greater than 0 A (timing t24) and then decrease again to 0 A (timing t25). The output signal S4 from the second comparison circuit 21 then falls to an L level. In response to the falling edge of the output signal S4, the control signal SG2 output from the timer circuit 42 falls to an L level. This releases the disablement of the detection signal SD of the comparator 15, and resumes the operation in the PFM mode. In this manner, the step-down DC-DC converter is changes to the circuit illustrated in FIG. 9 in a simulated manner and operates in the PFM mode.

In detail, at timing t26, the main transistor T1 is inactivated in response to an L level control signal DH, and the synchronous transistor T2 is activated in response to an H level control signal DL. Activation of the synchronous transistor T2 forms a passage in which current flows from the ground to the output terminal Po. This gradually decreases the coil current IL flowing through the current passage. As a result, the output voltage Vo decreases gradually. When the coil current IL reaches 0 A (timing t27), the comparator 15 outputs an L level detection signal SD, and provides an L level control signal DL1 to the transistor T2 irrespective of the signal level of the control signal SL. This inactivates the transistor T2, and prevents the coil current IL from flowing reversely. The coil current IL is maintained at 0 A until the feedback voltage VFB becomes lower than the first reference voltage Vr1 and the main transistor T1 is activated. In the PFM mode with a light load (no load), the coil current IL is maintained at 0 A, and the coil current changes discontinuously (a current discontinues mode). This operation reduces the loss of energy accumulated in the coil L1 and prevents the conversion efficiency from decreasing in the light load (no load) state.

The second embodiment described above has the advantages described below.

(1) The complementary switching of the transistors T1 and T2 is disabled and the transistors T1 and T2 are inactivated when the output voltage Vo reaches the second reference voltage Vr2. This causes the coil current IL to change by a greater amount, and decreases the overshooting amount ΔVo of the output voltage Vo.

(2) The complementary switching of the transistors T1 and T2 is released from the disabled state when the coil current IL reaches 0 A. Further, the detection signal SD of the comparator 15 is invalidated to allow the coil current IL to flow reversely for a certain period from the when the transistor switching is enabled. In the certain period, the step-down DC-DC converter is operates in the PWM mode. This enables the output voltage Vo to decrease rapidly and shortens the period in which the output voltage Vo is overshooting.

(3) The H level control signal SG2 for invalidating the detection signal SD output from the comparator 15 is generated at least during the period in which the reverse flow of the coil current IL is detected again after the coil current IL reaches 0 A. The reverse flow of the coil current IL that is detected again indicates that the operation in the PWM mode has been stabilized. In this state, the switching of the operation mode to the PFM mode at this timing would enable the DC-DC converter to stably operate in the PFM mode. In this manner, the timing at which the coil current IL starts flowing reversely is used to trigger the falling of the control signal SG2 to an L level. This enables an H level control signal SG2 to be generated for an optimum period of time. The optimum period of time may be set simply by detecting the reverse flow of the coil current IL. This eliminates the need for calibration and other processes for setting the optimum period. Also, the H level control signal SG2 may be generated for the optimum period of time irrespective of the method of controlling the step-down DC-DC converter is or the constants of external elements of the DC-DC converter 1a.

Other Embodiments

The above embodiments may be modified as in the following forms.

The internal configuration of the timer circuit 42 in the second embodiment is not limited to the circuit configuration illustrated in FIG. 7. The timer circuit 42 may have any configuration that may generate a signal for invalidating the detection signal SD of the comparator 15 for a certain period from when the complementary switching of the main transistor T1 and the synchronous transistor T2 is released from a disabled state.

Figure 13:
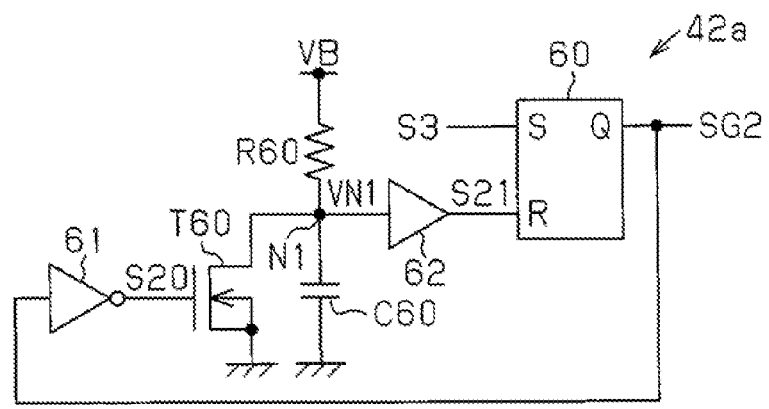
FIG. 13 is a circuit diagram illustrating a modified timer circuit.

For example, the timer circuit 42 of the second embodiment of the present invention may be changed to a timer circuit 42a illustrated in FIG. 13. In detail, a reset dominant RS-FF circuit 60 has a set terminal S provided with an output signal S3 output from the above first comparison circuit 20. The RS-FF circuit 60 has an output terminal Q from which the above control signal SG2 is output, which is then provided to an inverter circuit 61. The inverter circuit 61 logically inverts the control signal SG2 to generate an inverted signal S20, and provides the inverted signal S20 to a gate of an N-channel MOS transistor T60.

The transistor T60 has its source grounded and its drain coupled to a first terminal of a capacitor C60. The capacitor C60 has a second terminal that is grounded.

A node N1 between the transistor T60 and the capacitor C60 is coupled to a first terminal of a resistor R60. A bias voltage VB is provided to a second terminal of the resistor R60. The node N1 is coupled to an input terminal of a buffer circuit 62. An output signal S21 from the buffer circuit 62 is provided to a reset terminal R of the RS-FF circuit 60.

Figure 14:
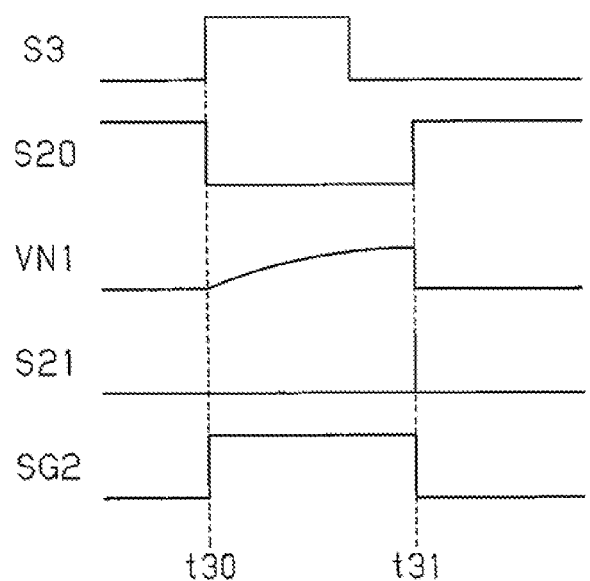
FIG. 14 is a timing chart illustrating the operation of the modified timer circuit.

The operation of the timer circuit 42a will be described with reference to FIG. 14.

In response to the rising edge of the output signal S3 output from the first comparison circuit 20, the RS-FF circuit 60 outputs an H level control signal SG2 (timing t30). In response to the H level control signal SG2, the inverter circuit 61 provides an L level inversion signal S20 to the transistor T60. As a result, the transistor T60 is inactivated, and the charge accumulates in the capacitor C60 in accordance with the current supplied through the resistor R60. As a result, the voltage VN1 at the first terminal (the node N1) of the capacitor C60 gradually increases (timings t30 to t31). The voltage at the node N1 approaches the bias voltage VB, and then the buffer circuit 62 outputs an H level output signal S21 (timing t31). The RS-FF circuit 60 is reset in response to the rising edge of the output signal S21, and the control signal SG2 output from the RS-FF circuit 60 falls to an L level.

As described above, an H level control signal SG2 is generated for a certain period determined by the resistance value of the resistor R60 and the capacitance value of the capacitor C60 after an H level output signal S3 is input from the first comparison circuit 20. The certain period is set to be longer than the period from when an H level output signal S3 is output from the first comparison circuit 20 to when an L level output signal S4 is output from the second comparison circuit 21.

Figure 15:
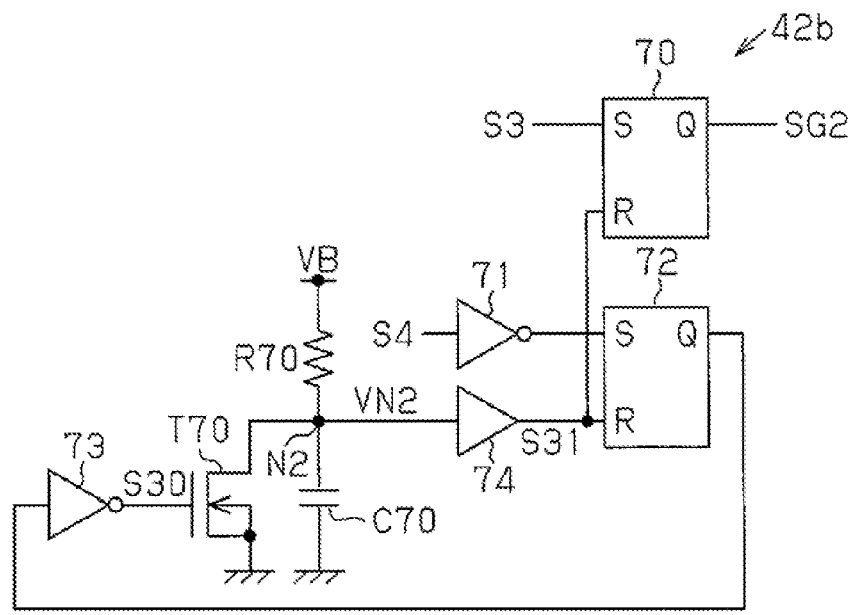
FIG. 15 is a circuit diagram of another modified timer circuit according to another modification.

Alternatively, the timer circuit 42 of the second embodiment may be changed to a timer circuit 42b illustrated in FIG. 15. In detail, a reset dominant RS-FF circuit 70 has a set terminal S provided with an output signal S3 output from the above first comparison circuit 20. The RS-FF circuit 70 has an output terminal Q from which the above control signal SG2 is output.

An output signal S4 output from the second comparison circuit 21 is provided to a set terminal S of the RS-FF circuit 72 via an inverter circuit 71. An output signal of the RS-FF circuit 72 is provided to an inverter circuit 73. The inverter circuit 73 logically inverts the control signal SG2 to generate an inverted signal S30. Then, the inverter circuit 73 outputs the inverted signal S30 to a gate of an N-channel MOS transistor T70.

The transistor T70 has the source grounded and the drain coupled to a first terminal of a capacitor C70. The capacitor C70 has a second terminal that is grounded.

A node N2 between the transistor T70 and the capacitor C70 is coupled to a first terminal of a resistor R70. A bias voltage VB is provided to a second terminal of a resistor R70. The node N2 is coupled to an input terminal of a buffer circuit 74. An output signal S31 from the buffer circuit 74 is provided to reset terminals R of the above RS-FF circuits 70 and 72.

Figure 16:
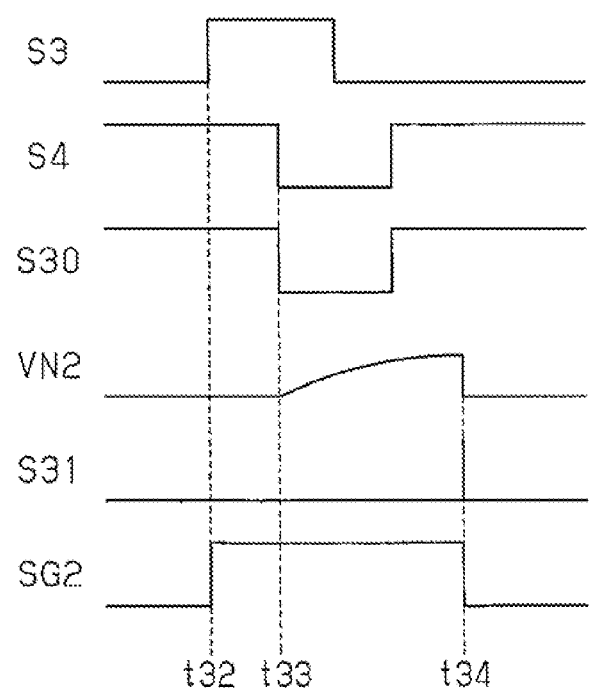
FIG. 16 is a timing chart illustrating the operation of the timer circuit.

The operation of the timer circuit 42b will be described with reference to FIG. 16.

In response to the rising edge of the output signal S3 output from the first comparison circuit 20, the RS-FF circuit 70 outputs an H level control signal SG2 (timing t32).

Subsequently, in response to the falling edge of the output signal S4 from the second comparison circuit 21, the RS-FF circuit 72 outputs an H level output signal and the inverter circuit 73 outputs an L level inverted signal S30 (timing t33). As a result, the transistor T70 is inactivated, and the charge accumulates in the capacitor C70 in accordance with the current supplied through the resistor R70. The voltage VN2 at the first terminal (the node N2) of the capacitor C70 gradually increases (timings t33 to t34). When the voltage VN2 at the node N2 approaches the bias voltage VB, the buffer circuit 74 outputs an H level output signal S31 (timing t34). The RS-FF circuits 70 and 72 are reset in response to the rising edge of the output signal S31, and the control signal SG2 output from the RS-FF circuit 70 falls to an L level.

As described above, an H level control signal SG2 is generated for a certain period determined by the resistance value of the resistor R60 and the capacitance value of the capacitor C60 after an H level output signal S3 is input from the first comparison circuit 20 and an L level output signal S4 is input from the second comparison circuit 21.

Figure 17:
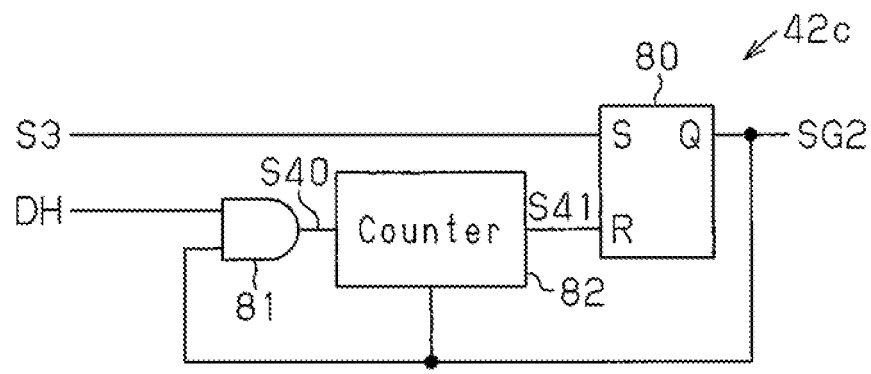
FIG. 17 is a circuit diagram illustrating a further modified timer circuit.

The timer circuit 42 of the second embodiment may also be changed to a timer circuit 42c illustrated in FIG. 17. In detail, a reset dominant RS-FF circuit 80 has a set terminal S provided with an output signal S3 output from the above first comparison circuit 20. The RS-FF circuit 80 has an output terminal Q from which the above control signal SG2 is output. The control signal SG2 is then provided to an input terminal of an AND circuit 81 and to a reset terminal of a counter 82.

The AND circuit 81 is provided with a control signal DH output from a drive circuit 14 (refer to FIG. 6). The AND circuit 81 generates an output signal S40 obtained from a logical AND operation of the control signal SG2 and the control signal DH. Then, the AND circuit 81 outputs the output signal S40 to the counter 82. For example, the AND circuit 81 outputs the control signal DH to the counter 82 as the output signal S40 when it is receiving an H level control signal SG2.

The counter 82 increments the count value whenever detecting the rising edge of the output signal S40. When the count value reaches a certain value (for example, ten), the counter 82 outputs an H level output signal S41 to a reset terminal R of the RS-FF circuit 80. The counter 82 resets the count value in response to an L level control signal SG2.

Figure 18:
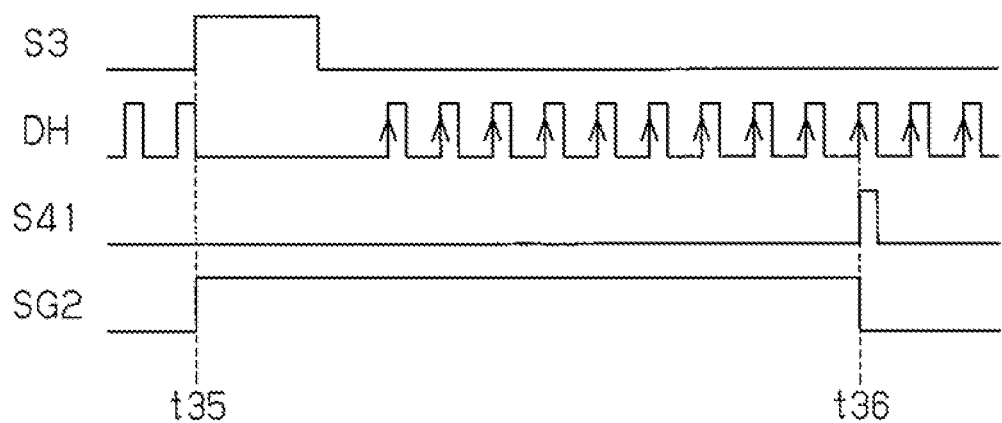
FIG. 18 is a timing chart illustrating the operation of the modified timer circuit.

The operation of the timer circuit 42c will be described with reference to FIG. 18.

In response to the rising edge of the output signal S3 output from the first comparison circuit 20, the RS-FF circuit 80 outputs an H level control signal SG2 (timing t35). In response to the H level control signal SG2, the AND circuit 81 outputs the control signal DH to the counter 82 as the output signal S40. When the counter 82 detects the rising edge of the output signal S40 (the control signal DH) a certain number of times (ten times in this example), the counter 82 outputs an H level output signal S41 (timing t36). The RS-FF circuit 80 is reset in response to the rising edge of the output signal S41. The control signal SG2 output from the RS-FF circuit 80 then falls to an L level.

As described above, an H level control signal SG2 is generated for a certain period from when an H level output signal S3 is input from the first comparison circuit 20 to when the rising edge of the control signal DH is detected a certain number of times.

Figure 19:
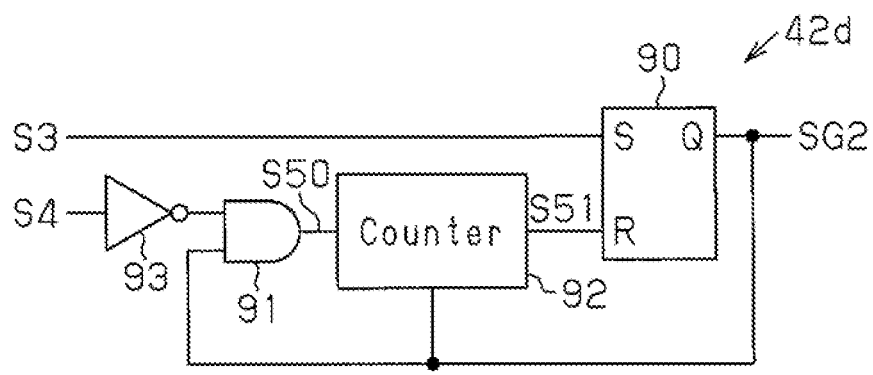
FIG. 19 is a circuit diagram illustrating still a further modified timer circuit.

The timer circuit 42 of the second embodiment may also be changed to a timer circuit 42d illustrated in FIG. 19. In detail, a reset dominant RS-FF circuit 90 has a set terminal S provided with an output signal S3 output from the above first comparison circuit 20. The RS-FF circuit 90 has an output terminal Q from which above control signal SG2 is output. The control signal SG2 is provided to an input terminal of an AND circuit 91 and to a reset terminal of a counter 92.

The AND circuit 91 is provided with an output signal S4 from the second comparison circuit 21 via an inverter circuit 93. The AND circuit 91 generates an output signal S50 obtained from a logical AND operation of the control signal SG2 and an output signal of an inverter circuit 93. Then, the AND circuit 91 outputs the output signal S50 to a counter 92. For example, the AND circuit 91 outputs the output signal of the inverter circuit 93 (the inverted signal of the output signal S4) to the counter 92 as the output signal S50 when it is receiving an H level control signal SG2.

The counter 92 increments the count value whenever detecting the rising edge of the output signal S50. When the count value reaches a certain value (for example, ten), the counter 92 outputs an H level output signal S51 to a reset terminal R of the RS-FF circuit 90. The counter 92 resets the count value in response to an L level control signal SG2.

Figure 20:
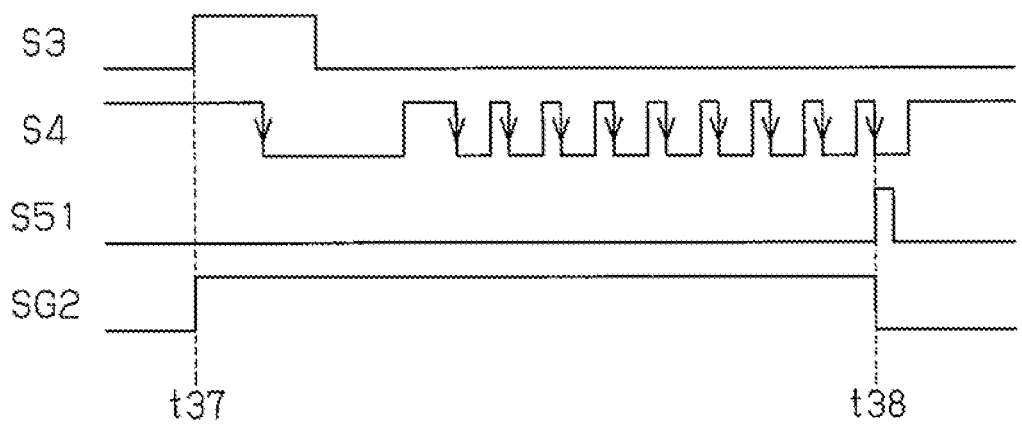
FIG. 20 is a timing chart illustrating the operation of the modified timer circuit.

The operation of the timer circuit 42d will be described with reference to FIG. 20.

In response to the rising edge of the output signal S3 output from the first comparison circuit 20, the RS-FF circuit 90 outputs an H level control signal SG2 (timing t37). In response to the H level control signal SG2, the AND circuit 91 outputs the inverted signal of the output signal S4 to the counter 92 as the output signal S50. When the counter 92 detects the rising edge of the output signal S50 (the falling edge of the output signal S4) a certain number of times (ten times in this example), the counter 92 outputs an H level output signal S51 (timing t38). The RS-FF circuit 90 is reset in response to the rising edge of the output signal S51. The control signal SG2 output from the RS-FF circuit 90 then falls to an L level.

As described above, an H level control signal SG2 is generated for a certain period from when an H level output signal S3 is input from the first comparison circuit 20 to when the falling edge of the output signal S4 is detected a certain number of times.

The timer circuit 42 of the second embodiment and the timer circuits 42a to 42d of the above modifications generate the control signal SG2 that rises to an H level in response to the rising edge of the output signal S3 output from the first comparison circuit 20. However, the timer circuits are not limited to these structures. For example, the timer circuits may generate a control signal SG2 that rises to an H level in response to the falling edge of an output signal S4 output from the second comparison circuit 21 after detecting an H level output signal S3.

In the above embodiments, the third reference value with which the coil current IL is compared is set at 0 A. However, the present embodiments are not limited to this value. For example, the third reference value may be set at a current value that is higher than 0 A. The setting to a higher current value enables, for example, the DC-DC converter of the second embodiment eliminating the third control circuit 40 to have the same advantages as advantages (1) and (2) described in the second embodiment.

The first comparison circuit 20 of the above embodiments compares the output voltage Vo with the second reference voltage Vr2. Alternatively, the first comparison circuit 20 may compare the value of the feedback voltage VFB with the second reference value for detecting overshooting of the output voltage Vo.

In the above embodiments, the transistor T1 is inactivated in accordance with an H level clock signal CLK that rises in certain cycles. Alternatively, for example, the transistor T1 may be inactivated when a certain time elapses after the rise timing of the output signal S1 of the comparator 11 (the timing at which the transistor T1 is activated). In this case, the oscillator 13 may be replaced by a timer circuit that outputs an H level control signal to the reset terminal R of the RS-FF circuit 12 after a period of time determined in accordance with the input voltage Vi and the output voltage Vo elapses from the rise timing of the output signal S1. Alternatively, the RS-FF circuit 12 and the oscillator 13 may be replaced by a one-shot flip flop circuit.

The second comparison circuit 21 and the comparator 15 may be integrated in the second embodiment. For example, the detection signal SD of the comparator 15 may be provided to the inverter circuit 23, the NAND circuit 31, and the timer circuit 42 instead of the output signal S4 of the second comparison circuit 21.

In the second embodiment, the reverse current detection comparator 15 is used as an example of the reverse current detection circuit. However, the reverse current detection circuit may be any circuit that may detect the reverse flow of the coil current IL. For example, a current sensing resistor for sensing a current may be coupled as an element subsequent to the coil L1. In this case, the reverse flow of the coil current IL may be detected by determining a potential difference between the two terminals of the current sensing resistance. Alternatively, a resistor and a capacitor may be coupled in parallel to the coil L1. In this case, the reverse flow of the coil current IL may be detected by direct current resistance (DCR) sensing using the resistor and the capacitor.

In the above embodiments, the partial voltage obtained by dividing the output voltage Vo using the resistors R1 and R2 is used as the feedback voltage VFB. Alternatively, for example, the output voltage Vo may be directly used as the feedback voltage VFB.

In the above embodiments, the N-channel MOS transistor is used as an example of the first switch. However, a P-channel MOS transistor may be used as the first switch, or a bipolar transistor may also be used as the first switch. Alternatively, a switch circuit including a plurality of transistors may be used as the first switch.

In the above embodiments, the N-channel MOS transistor is used as an example of the second switch. However, a P-channel MOS transistor may be used as the second switch. Alternatively, a bipolar transistor may also be used as the second switch. Alternatively, a switch circuit including a plurality of transistors may be used as the second switch.

In the above embodiments, the transistors T1 and T2 may be elements of the control circuits 3 and 3a. The conversion unit 2 may also be an element of the control circuits 3 and 3a.

In the above embodiments, the present invention is embodied as the step-down DC-DC converter that uses the comparator control, which is one type of hysteresis control. With the comparator control, the step-down DC-DC converter controls switching of the transistors by using the feedback signal representing the voltage waveform of the ripple generated in the output voltage Vo and constantly comparing the bottom value of the ripple voltage waveform with the reference voltage Vr1 using the comparator 11. Alternatively, for example, the present invention may be embodied as a DC-DC converter using other hysteresis control, voltage control, or current control. For example, the first control circuit 10 may be modified to any control circuit that may switch the transistors T1 and T2 in a complementary manner in accordance with a comparison between a voltage based on the output voltage Vo and a reference value.

In the above embodiments, the DC-DC converters are step-down DC-DC converters. Alternatively, the DC-DC converter of the each embodiment may be a buck-boost DC-DC converter. In this case, the buck-boost DC-DC converter may decrease, using its control circuit, the amount of overshooting ΔVo of the output voltage Vo that may occur when the load changes suddenly during the step-down operation. Further, the period in which the output voltage Vo is overshooting may be shortened.

Figure 21:
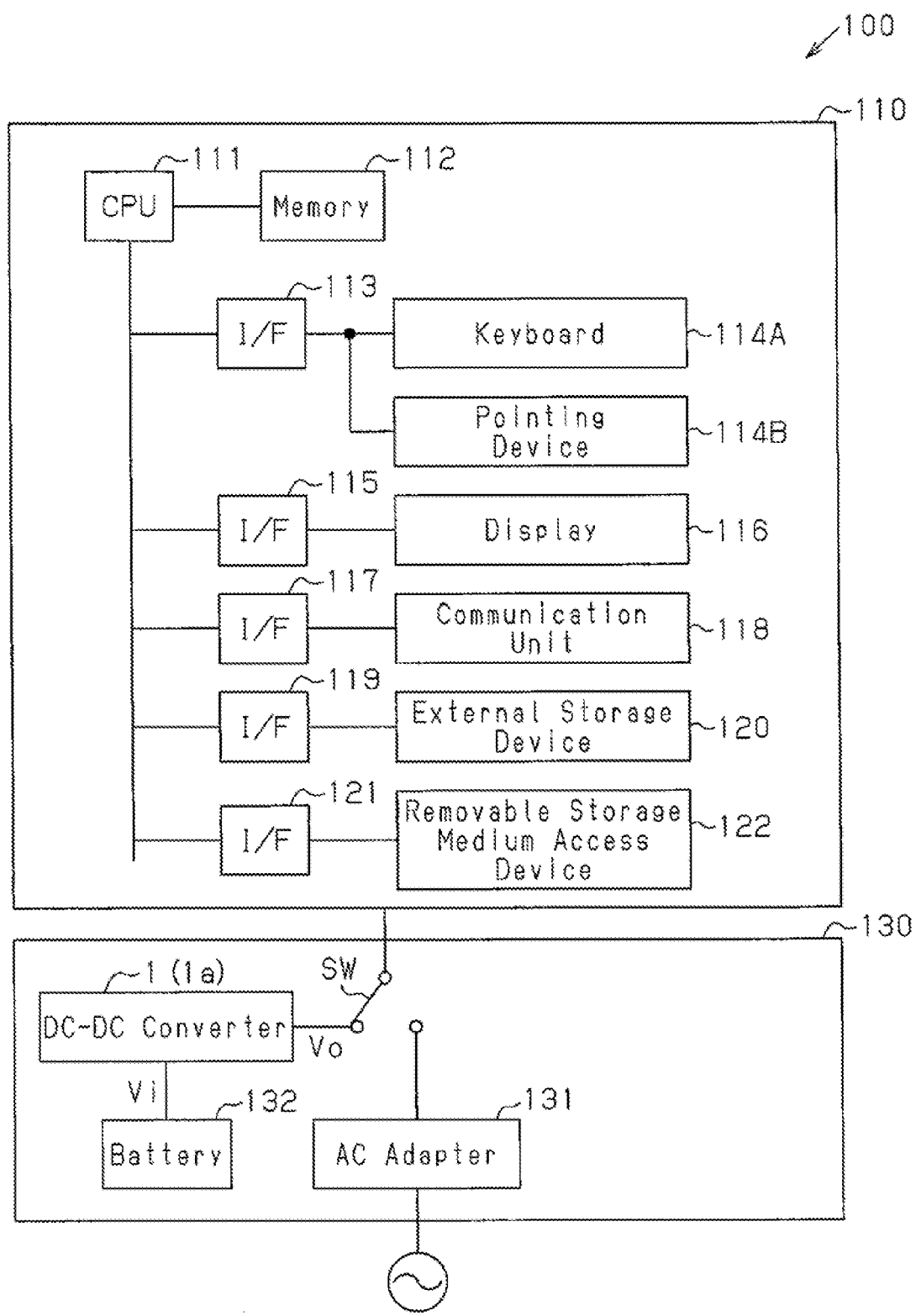
FIG. 21 is a schematic diagram illustrating the structure of an electronic device.
Figure 22:
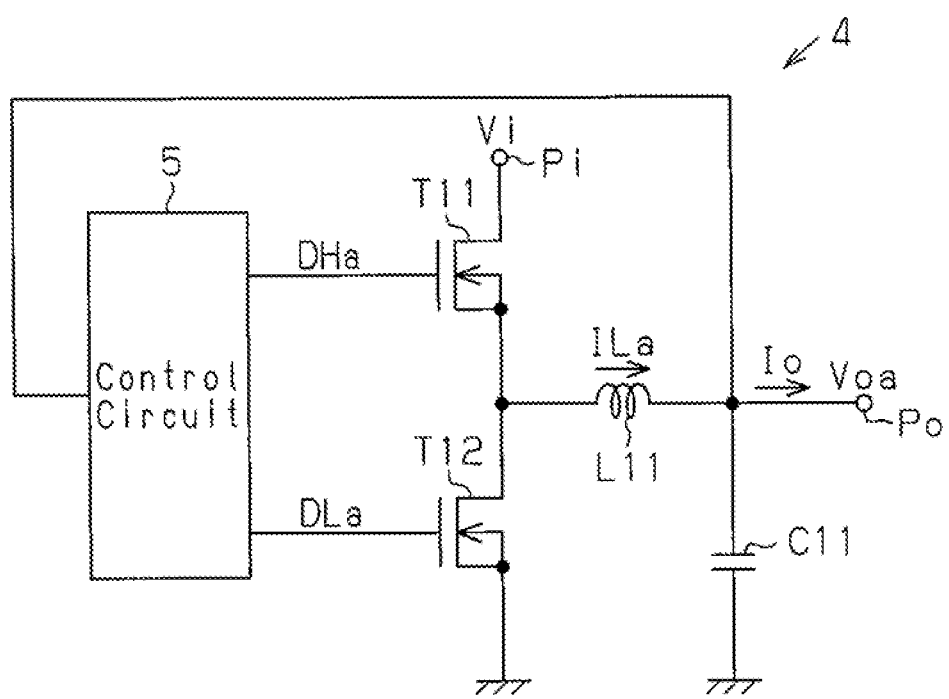
FIG. 22 is a block circuit diagram of a conventional DC-DC converter.

FIG. 21 illustrates an example of an electronic device 100 including the DC-DC converter 1 (or the DC-DC converter 1a). The electronic device 100 includes a main unit 110 (an internal circuit) and a power supply unit 130 for supplying power to the main unit 110.

The internal configuration of the main unit 110 will be described.

A memory 112 is coupled to a central processing unit 111 that executes programs. The memory 112 stores the programs executed by the CPU 111 and data processed by the CPU 111. A keyboard 114A and a pointing device 114B are also coupled to the CPU 111 via an interface (I/F) 113. The pointing device 114B may be, for example, a mouse, a trackball, a touch panel, or a flat device having an electrostatic sensor.

A display 116 is coupled to the CPU 111 via an I/F 115. A communication unit 118 is coupled to the CPU 111 via an I/F 117. The display 116 may be a liquid crystal display or an electroluminescence panel. The communication unit 118 may be a local area network board.

An external storage device 120 is coupled to the CPU 111 via an I/F 119. A removable storage medium access device 122 is coupled to the CPU 111 via an I/F 121. The external storage device 120 may be a hard disk. The access device 122 may access various removable storage media including a compact disc (CD), a digital versatile disc (DVD), and a flash memory card.

The internal configuration of the power supply unit 130 will be described.

The DC-DC converter 1 (or the DC-DC converter 1a) and an alternating current adapter 131 are coupled to the main unit 110 via a switch SW. The main unit 110 is supplied with power from one of the DC-DC converter 1 (or the DC-DC converter 1a) and the alternating current adapter 131. In the example of FIG. 21, the DC-DC converter 1 (or the DC-DC converter 1a) converts an input voltage Vi input from a battery 132 to an output voltage Vo and supplies the output voltage Vo to the main unit 110.

Examples of the above electronic device include a notebook personal computer, a communication device such as a mobile telephone, an information processing device such as a personal digital assistant (PDA), an imaging device such as a digital camera or a video camera, and a receiver such as a television set.

All examples and conditional language recited herein are intended for pedagogical purposes to aid the reader in understanding the principles of the embodiment and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A control circuit comprising:
a first control circuit coupled to a first switch and a second switch of a power supply, wherein the first control circuit is configured to switch the first switch and a second switch in a complementary manner in accordance with a comparison result of a first reference voltage and a voltage value of a feedback voltage corresponding to an output voltage of the power supply;
a first comparison circuit configured to compare one of a voltage value of the output voltage and the voltage value of the feedback voltage with a second reference value; and
a second comparison circuit configured to compare a current value of a coupling point current flowing through a point between the first switch and the second switch with a third reference value; and
a second control circuit configured to disable complementary switching of the first switch and the second switch and configured to inactivate the second switch in accordance with an output signal from the first comparison circuit, wherein the second control circuit enables the disabled complementary switching in accordance with an output signal of the second comparison circuit.

2. The control circuit according to claim 1, wherein the second comparison circuit compares a voltage value at the coupling point with a fourth reference value and determines whether the coupling point current has reached the third reference value.

3. The control circuit according to claim 1, further comprising:
a reverse current detection circuit configured to inactivate the second switch when detecting reverse flow of the coupling point current toward an input side; and
a third control circuit configured to invalidate an output of the reverse current detection circuit at least for a certain period from when the disabled complementary switching is enabled.

4. The control circuit according to claim 3, wherein the certain period is a period from when the disabled complementary switching is enabled to when the reverse current of the coupling point current is detected.

5. The control circuit according to claim 3, wherein the third control circuit includes a signal generation circuit configured to generate a signal for invalidating an output of the reverse current detection circuit from when the complementary switching is disabled to when the reverse flow of the coupling point current is detected after the disabled complementary switching is enabled.

6. The control circuit according to claim 3, wherein the third control circuit includes a signal generation circuit configured to generate a signal for invalidating the output of the reverse current detection circuit until a certain period elapses from when the disabled complementary switching is enabled after the complementary switching is disabled.

7. The control circuit according to claim 1, wherein
the first comparison circuit configured to generate a first detection signal when the voltage value of the output voltage reaches the second reference value that is greater than a target value of the output voltage,
the second comparison circuit configured to generate a second detection signal when the current value of the coupling point current reaches the third reference value of 0 A, and
the second control circuit configured to disable the complementary switching in response to the first detection signal and enables the disablement of the complementary switching in response to the second detection signal.

8. An electronic device comprising:
a power supply including a first switch, a second switch, and a control circuit; and an internal circuit supplied with an output voltage of the power supply, wherein the control circuit includes:
- a first control circuit configured to switch the first switch and the second switch of the power supply in a complementary manner in accordance with a comparison result of a first reference value and a voltage value of a feedback voltage corresponding to the output voltage of the power supply,
- a first comparison circuit configured to compare one of a voltage value of the output voltage and the voltage value of the feedback voltage with a second reference value,
- a second comparison circuit configured to compare a current value of a coupling point current flowing through a point between the first switch and the second switch with a third reference value,
- a second control circuit configured to disable complementary switching of the first switch and the second switch and configured to inactivate the second switch in accordance with an output signal from the first comparison circuit, wherein the second control circuit enables the disabled complementary switching in accordance with an output signal from the second comparison circuit.

9. The electronic device according to claim 8, wherein the second comparison circuit compares a voltage value at the coupling point with a fourth reference value and determines whether the coupling point current has reached the third reference value.

10. The control circuit according to claim 8, further comprising:
- a reverse current detection circuit configured to inactivate the second switch when detecting reverse flow of the coupling point current toward an input side; and
- a third control circuit configured to invalidate an output of the reverse current detection circuit at least for a certain period from when the disabled complementary switching is enabled.

11. The control circuit according to claim 10, wherein the certain period is a period from when the disabled complementary switching is enabled to when the reverse current of the coupling point current is detected.

12. The control circuit according to claim 10, wherein the third control circuit includes a signal generation circuit configured to generate a signal for invalidating an output of the reverse current detection circuit from when the complementary switching is disabled to when the reverse flow of the coupling point current is detected after the disabled complementary switching is enabled.

13. The control circuit according to claim 10, wherein the third control circuit includes a signal generation circuit configured to generate a signal for invalidating the output of the reverse current detection circuit until a certain period elapses from when the disabled complementary switching is enabled after the complementary switching is disabled.

14. The electronic device according to claim 8, wherein:
- the first comparison circuit configured to generate a first detection signal when the voltage value of the output voltage reaches the second reference value that is greater than a target value of the output voltage,
- the second comparison circuit configured to generate a second detection signal when the current value of the coupling point current reaches the third reference value of 0 A, and
- the second control circuit configured to disable the complementary switching in response to the first detection signal and enables the disablement of the complementary switching in response to the second detection signal.

15. A method for controlling a power supply comprising:
- switching a first switch and a second switch of a power supply in a complementary manner in accordance with a comparison result of a first reference value and a voltage value of a feedback voltage corresponding to an output voltage of the power supply;
- disabling complementary switching of the first switch and the second switch and inactivating the second switch when one of a voltage value of the output voltage and the voltage value of the feedback voltage reaches a second reference value that is greater than a target value of the output voltage; and
- enabling the disabled complementary switching when a current value of a coupling point current flowing through a point between the first switch and the second switch reaches a third reference value.

* * * * *

UNITED STATES PATENT AND TRADEMARK OFFICE
CERTIFICATE OF CORRECTION

| | | |
|---|---|---|
| PATENT NO. | : 8,823,344 B2 | Page 1 of 1 |
| APPLICATION NO. | : 13/328775 | |
| DATED | : September 2, 2014 | |
| INVENTOR(S) | : Kushida et al. | |

It is certified that error appears in the above-identified patent and that said Letters Patent is hereby corrected as shown below:

<u>In the Claims:</u>

Claim 1, column 22, lines 8-9, "value; and" should read --value;--;

Claim 5, column 22, line 41, "invalidating an" should read --invalidating the--;

Claim 8, column 23, line 8, "power supply," should read --power supply;--;

Claim 8, column 23, line 12, "value," should read --value;--; and

Claim 8, column 23, line 16, "value," should read --value; and--.

Signed and Sealed this
Sixteenth Day of December, 2014

Michelle K. Lee
*Deputy Director of the United States Patent and Trademark Office*